United States Patent
Guthrie et al.

(10) Patent No.: US 8,645,644 B2
(45) Date of Patent: *Feb. 4, 2014

(54) FACILITATING DATA COHERENCY USING IN-MEMORY TAG BITS AND TAG TEST INSTRUCTIONS

(75) Inventors: Guy L. Guthrie, Austin, TX (US); Geraint North, Manchester (GB); William J. Starke, Round Rock, TX (US); Derek E. Williams, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/451,682

(22) Filed: Apr. 20, 2012

(65) Prior Publication Data
US 2012/0297146 A1 Nov. 22, 2012

Related U.S. Application Data

(63) Continuation of application No. 13/109,254, filed on May 17, 2011.

(51) Int. Cl.
*G06F 12/00* (2006.01)
(52) U.S. Cl.
USPC .......................................... 711/159; 711/220
(58) Field of Classification Search
USPC ................... 711/117, 118, 119, 126, 159
See application file for complete search history.

(56) References Cited

U.S. PATENT DOCUMENTS 6,549,959 B1    4/2003   Yates et al.
(Continued)

FOREIGN PATENT DOCUMENTS

EP            1 760 559 B1    3/2010

OTHER PUBLICATIONS

Chen, Shimin et al., "Flexible Hardware Acceleration for Instruction-Grain Program Monitoring," ACM SIGARCH Computer Architecture News, vol. 36, Issue 3, Jun. 2008.

(Continued)

*Primary Examiner* — Reginald Bragdon
*Assistant Examiner* — Christopher Do
(74) *Attorney, Agent, or Firm* — Steven Chiu, Esq.; Kevin P. Radigan, Esq.; Heslin Rothenberg Farley & Mesiti P.C.

(57) ABSTRACT

A method is provided for fine-grained detection of data modification of original data by associating separate guard bits with granules of memory storing original data from which translated data has been obtained. The guard bits indicating whether the original data stored in the associated granule is protected for data coherency. The guard bits are set and cleared by special-purpose instructions. Responsive to attempting access to translated data obtained from the original data, the guard bit(s) associated with the original data is checked to determine whether the guard bit(s) fail to indicate coherency of the original data, and if so, discarding of the translated data is initiated to facilitate maintaining data coherency between the original data and the translated data.

10 Claims, 17 Drawing Sheets

(56) References Cited

U.S. PATENT DOCUMENTS

| | | | |
|---|---|---|---|
| 6,952,758 | B2 | 10/2005 | Chron et al. |
| 7,486,180 | B2 | 2/2009 | Cox et al. |
| 7,823,013 | B1 | 10/2010 | O'Krafka et al. |
| 8,195,883 | B2 * | 6/2012 | Jain et al. ............ 711/122 |
| 8,291,174 | B2 | 10/2012 | Resnick |
| 2008/0235757 | A1 | 9/2008 | Li |
| 2010/0088673 | A1 * | 4/2010 | Chen et al. ............ 717/110 |
| 2012/0296877 | A1 | 11/2012 | Guthrie et al. |
| 2012/0297109 | A1 | 11/2012 | Guthrie et al. |

OTHER PUBLICATIONS

Kannan, Hari et al., "Decoupling Dynamic Information Flow Tracking with a Dedicated Coprocessor," IEEE/IFIP International Conference on Dependable Systems & Networks, Sep. 28, 2009.

Guthrie et al., Notice of Allowance for U.S. Appl. No. 13/109,254, filed May 17, 2011 (U.S. Patent Publication No. 2012/0296877 A1), dated Apr. 5, 2013.

Guthrie et al., Office Action for U.S. Appl. No. 13/109,249, filed May 17, 2011 (U.S. Patent Publication No. 2012/0297109 A1), dated May 9, 2013 (23 pgs.).

* cited by examiner

IF BASE = 0 THEN b ← 0
ELSE b ← [BASE]
EA ← (b + EXTS(OFFSET || 0b0000000)) & ~ 0b1111111
GUARD (EA) = 1

TAGTEST OFFSET(BASE)

IF BASE = 0 THEN b ← 0
  ELSE b ← [BASE]
EA ← (b + EXTS(OFFSET || 0b0000000)) & ~ 0b1111111
XER[SO] = XER[SO] | ~ GUARD(EA)

TAGTEST RT,OFFSET(BASE)

IF BASE = 0 THEN b ← 0
  ELSE b ← [BASE]
EA ← b + EXTS(OFFSET || 0b0000000)
RT ← GUARD(EA)

TAGTEST OFFSET(BASE)

IF BASE = 0 THEN b ← 0
  ELSE b ← [BASE]
EA ← b + EXTS(OFFSET || 0b0000000)
t ← GUARD(EA)
IF ~t
  $CR_0$ = 1

FACILITATING DATA COHERENCY USING IN-MEMORY TAG BITS AND TAG TEST INSTRUCTIONS

CROSS-REFERENCE TO RELATED APPLICATION

This application is a continuation of U.S. Ser. No. 13/109,254, entitled "FACILITATING DATA COHERENCY USING IN-MEMORY TAG BITS AND TAG TEST INSTRUCTIONS," filed May 17, 2011, and which is hereby incorporated herein by reference in its entirety.

BACKGROUND

In computing, binary translation is the emulation of one instruction set by another through translation of code. Sequences of instructions are translated from the source to the target instruction set. For example, a program may be written in a high-level programming language and translated into machine code for execution by a particular machine. The conversion process may be done, for example, in a compiler.

Static binary translation is a type of translation where an entire executable file is translated into an executable of the target architecture. This is very difficult to do correctly because not all the code can be discovered by the translator. For example, some parts of the executable may be reachable only through indirect branches whose value is only known at run-time.

Alternatively, dynamic translation looks at a short sequence of code, typically on the order of a single basic block, translates it and caches the resulting sequence. Code is only translated as it is discovered and when possible, branch instructions are made to point to previously translated code.

Dynamic binary Translation differs from simple emulation in that it eliminates the emulator's main read-decode-execute loop (a major performance bottleneck). Of course, elimination of this loop may cause extra overhead during translation time. This overhead is hopefully amortized as translated code sequences are executed multiple times.

BRIEF SUMMARY

In binary or dynamic translation of software code (particularly, machine code), situations may arise where the original code modifies itself. In such situations, to ensure correctness in the case that the software application modified its own original code at runtime, an efficient facility is desired to identify an inconsistent alternative representation of the original code and discard the alternative representation.

The shortcomings of the prior art are overcome and additional advantages are provided through the provision of a method which facilitates data coherency. The method includes, for instance: responsive to attempting access to translated data obtained from original data, checking, by a processor, at least one guard bit associated with the original data to ascertain whether the at least one guard bit indicates coherency with the original data, and, responsive to ascertaining that the at least one guard bit fails to indicate coherency with the original data, initiating discarding of the translated data.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
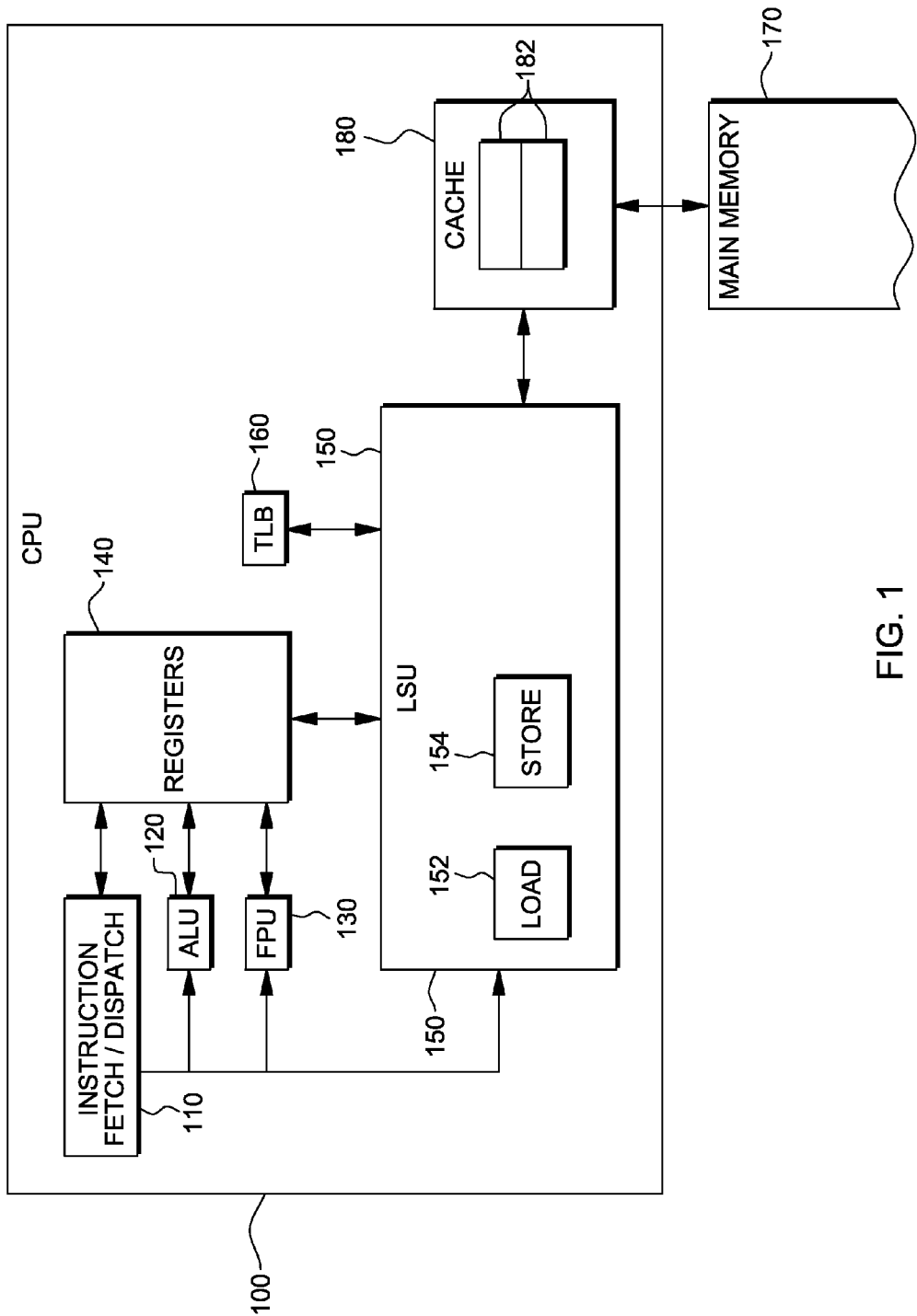
FIG. 1 is a block diagram depicting one embodiment of a computing platform.

It is advantageous to receive notification when certain locations in address space of a running software application are modified. In addition to being useful for debugging purposes, there are situations in which such a feature is useful during normal program execution. Principally for performance reasons and processing efficiency, it is sometimes desirable for a hardware or software module to maintain an alternative representation of some data. When this alternative representation has been created, a difficulty arises when it is possible for the original data to be modified without notifying the module that is maintaining the alternative representation. In this situation, it is useful to obtain notification when attempting to access the alternative representation that the original data has changed so that the alternative representation (which is now inconsistent with the modified original data) can be discarded and replaced with a new alternative representation obtained from the modified original data.

One specific situation involves Dynamic Binary Translation which, as noted above, is a technique that allows a software application whose binary code has been compiled for one particular CPU to be recompiled on-the-fly into an alternative representation so that it can be executed on a different CPU architecture.

One technique to address the above involves "watchpoint registers" provided on a CPU (for example, watchpoint registers available on the ARM11™ processor, offered by ARM Ltd, Cambridge, United Kingdom, or the DABR register on POWER® processors, offered by International Business Machines, Inc., Armonk N.Y.). A watchpoint register allows a small number of addresses or address ranges to be "watched" and configured such that a load or store by that CPU to a region of memory described by a watchpoint will cause a fault to be delivered. Another technique involves marking as read-only entire pages of memory (typically 4K or 64K in size). In that case, all attempts to modify any part of a page marked read-only will cause a protection fault and a subsequent trap, in which the faulting address can indicate the piece of memory that was about to be modified.

Both techniques have their drawbacks. A CPU's watchpoint function is not capable of watching an arbitrarily large set of potentially nonconsecutive addresses for attempted modification. For example, the POWER® architecture's DABR register can watch only one 64-bit region at a time. Whole-page protection, on the other hand, can be used to protect large amounts of data, but it has a coarse granularity, wherein write-protecting a page to guard against the modification of relatively few interesting bytes of data can result in many unnecessary faults when other bytes on that page are modified.

Aspects of the present invention provide capabilities by which a software or hardware module can be obtain notification when an attempt is made to access inconsistent translated data obtained from original data that lacks coherency (for example, was modified after the translated data was obtained from the original data). The module can then initiate discarding the translated version, which can facilitate maintaining data coherency, for example by discarding the translated data which is inconsistent with the now modified original data, and, if desired, retranslating the now modified original data.

FIG. 1 is a block diagram of one embodiment of a computing platform comprising a general-purpose, central processing unit (CPU) 100 coupled to a main memory 170. As shown, CPU 100 includes an instruction fetch/dispatch cycle 110, an arithmetic logic unit (ALU) 120, a floating-point unit (FPU) 130, and a load/store unit (LSU) 150, each of which is coupled to one or more register(s) 140 via, for example, one or more buses or other connections. Typically, a "program counter" register, resident within registers 140, stores an address of a current instruction for fetch by instruction fetch/dispatch cycle 110 for subsequent execution.

After being fetched, the instruction is dispatched to an appropriate logical unit, such as ALU 120, FPU 130, or LSU 150. As is known, ALU 120 performs arithmetic and other operations (such as integer operations), FPU 130 performs floating-point operations, and LSU 150 performs data load and store operations (which move data between memory 170 and registers 140). Data load operations include loading an instruction for fetch by instruction fetch/dispatch cycle 110. Other logical units may also be available within CPU 100, as will be appreciated by those having ordinary skill in the art.

In one embodiment, LSU 150 accesses main memory 170 using a translation lookaside buffer (TLB) 160. TLB 160 is used to convert virtual addresses into physical addresses that indicate the actual location of the data in main memory 170. Between LSU 150 and main memory 170 is cache 180, which caches some subset(s) of main memory 170 in cache lines 182. A cache is typically employed for efficiency and speed, in that accesses to cache 180 by the LSU are faster than accesses to main memory 170. LSU 150 includes a load operation 152 for loading data into the CPU from main memory 170, via cache 180, and into registers 140, and a store operation 154 for storing data to main memory 170 (via cache 180).

Figure 2:
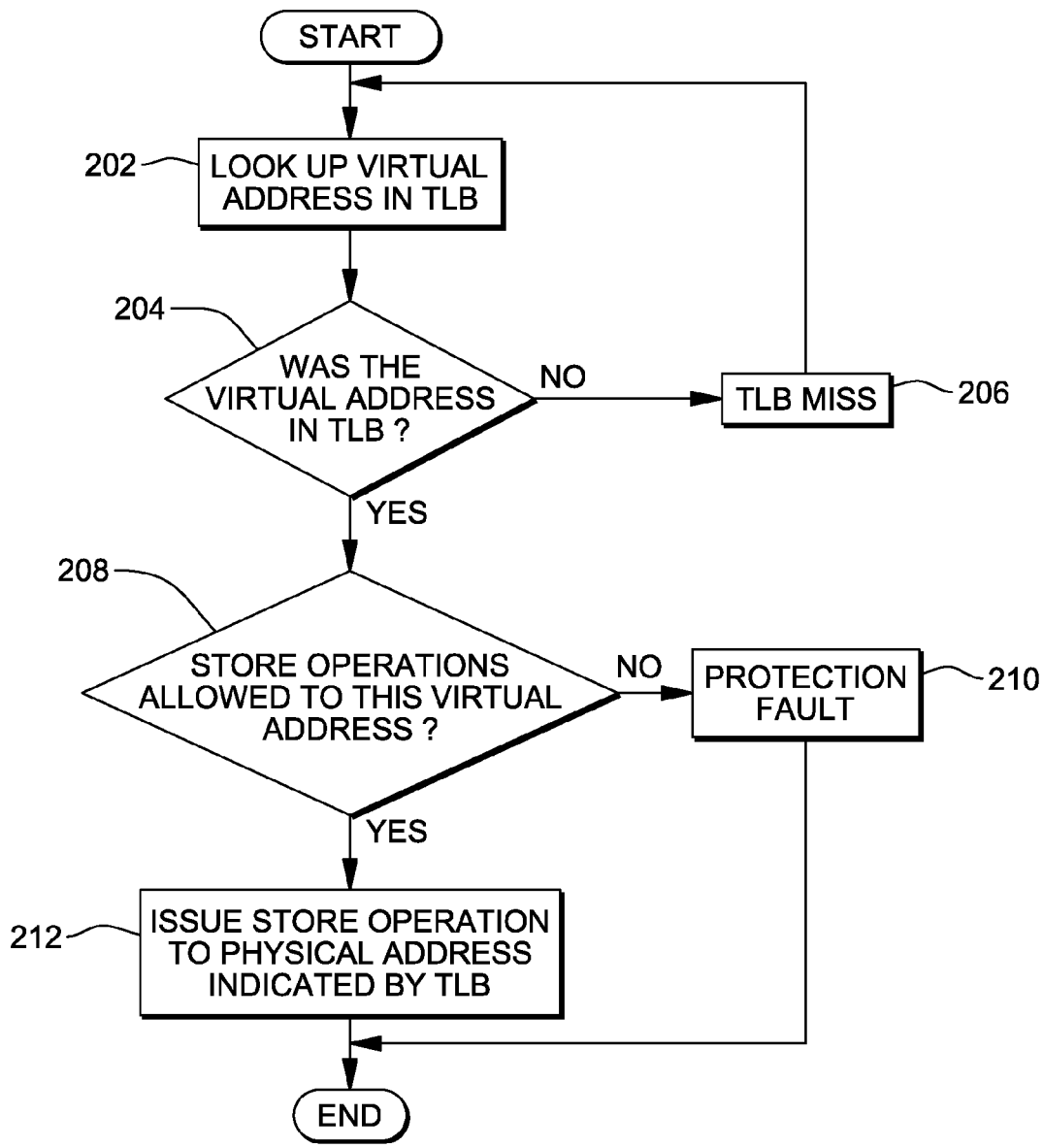
FIG. 2 depicts one embodiment of a store operation performed by the load/store unit of FIG. 1.

One embodiment of a store operation 154 is depicted in FIG. 2. Upon initiating the store operation to a specific virtual address, a lookup 202 is performed in the TLB for the virtual address in order to obtain an address mapping to an equivalent physical address. The TLB does not maintain a full mapping of addresses. It typically only has enough space to store a commonly-used subset of mappings, and so the desired virtual-to-physical address mapping may not be present in the TLB. Consequently, the store operation next determines whether a mapping exists, 204, i.e. whether the virtual address appears in the TLB. If the virtual address is not in the TLB, a TLB miss 206 results, causing (for instance) a TLB miss fault to be delivered to the operating system, which then inspects its own data structures (which are much larger than the data that could be stored in the TLB) and fills the TLB accordingly. The operation is then reinitiated and processing looks up 202 the virtual address in the TLB.

If processing determines that the TLB mapping is found, then the mapping is then inspected to determine whether store operations to that address are permitted 208 (for instance by the architecture's general protection fault scheme). If store operations are not permitted, a protection fault 210 is delivered which is typically handled by the operating system, or presented to a user application that attempted the store operation.

If a mapping exists and is authorized for store operations, the store is issued 212 to the cache at the calculated physical address. Various cache systems across different computing platforms will deal with the store operation differently. For instance, some systems will maintain the new data in the cache, and others will immediately pass the data to main memory. The present invention is equally applicable to the various systems.

Aspects of the present invention advantageously enable fine-grained detection of data modification by associating a separate guard bit (also referred to herein as a "tag" or "tag bit") with a region of memory, down to a desired resolution (for example, one guard bit per cache line, or one guard bit per 32-bit word, per 64-bit word, etc.). In one particular embodiment, the guard bits are not visible through regular load and store instructions, for instance those carried out by the load/store unit, but rather can be modified by new instruction(s) provided specifically for this purpose, as described below. The guard bit associated with a particular region or granule of memory provides a facility for indicating whether the granule along with the data stored therein is indicated as "protected", that is, to indicate coherency with the original data. Coherency indicated by a guard bit indicates coherency of some data (e.g. translated data) with the original data stored in the granule. For instance, when the original data in the granule is modified, the guard bit can be used to reflect this modification, and indicate that the modified version of the original data is no longer coherent translated data obtained from the prior version of the original data. Coherency as between translated data and original data means that the translated data is an accurate translation of the original data. In some embodiments, it means that the translated data is a copy of the original data, if the translated data is intended to be a mere copy. However, in Dynamic Binary Translation, the translated data (or at least a portion thereof) will likely be different from the original data, having been translated by, e.g. a compiler. In this case, coherency between the translated data and the original data means that the translated data is an accurate translation by the compiler of the original data. The terms 'coherent' and 'consistent' may be used interchangeably herein.

A region of memory having an associated guard bit is referred as a "granule", and a granule represents the finest-level resolution of data coherency the system is interested in maintaining. The invention is applicable to granules of virtually any size. It would typically be (though does not have to be) at least as big as the largest store operation that can be performed, and would typically be less than the size of a memory page, meaning a single memory page could include multiple granules of memory. A granule size of between 8 and 128 bytes might be an appropriate size.

Aspects of the present invention provide a notification mechanism which, when an attempt is made to access an alternative representation of original data, indicates whether the alternative representation is coherent with the original data. One particular situation in which aspects of the present invention may be employed, though applicable in many others, is to provide notification when attempting access to a dynamic binary translation of source data which was modified after translating the source data. In dynamic binary translation, foreign binary code is translated into an alternative representation executable on a computing platform. The present invention efficiently supports self-modifying code, wherein the foreign code might be modified following translation thereof into an executable alternative representation, for instance modified by one or more data store operations initiated by the code itself during its execution. In such a case, the present invention allows the dynamic binary translator to obtain notification of the modification to the original foreign code, thus allowing it to discard the out-of-date executable alternative representation, and generate a new executable alternative representation from the modified foreign code. The use of the present invention with dynamic binary translators is provided by way of example only.

Figure 3:
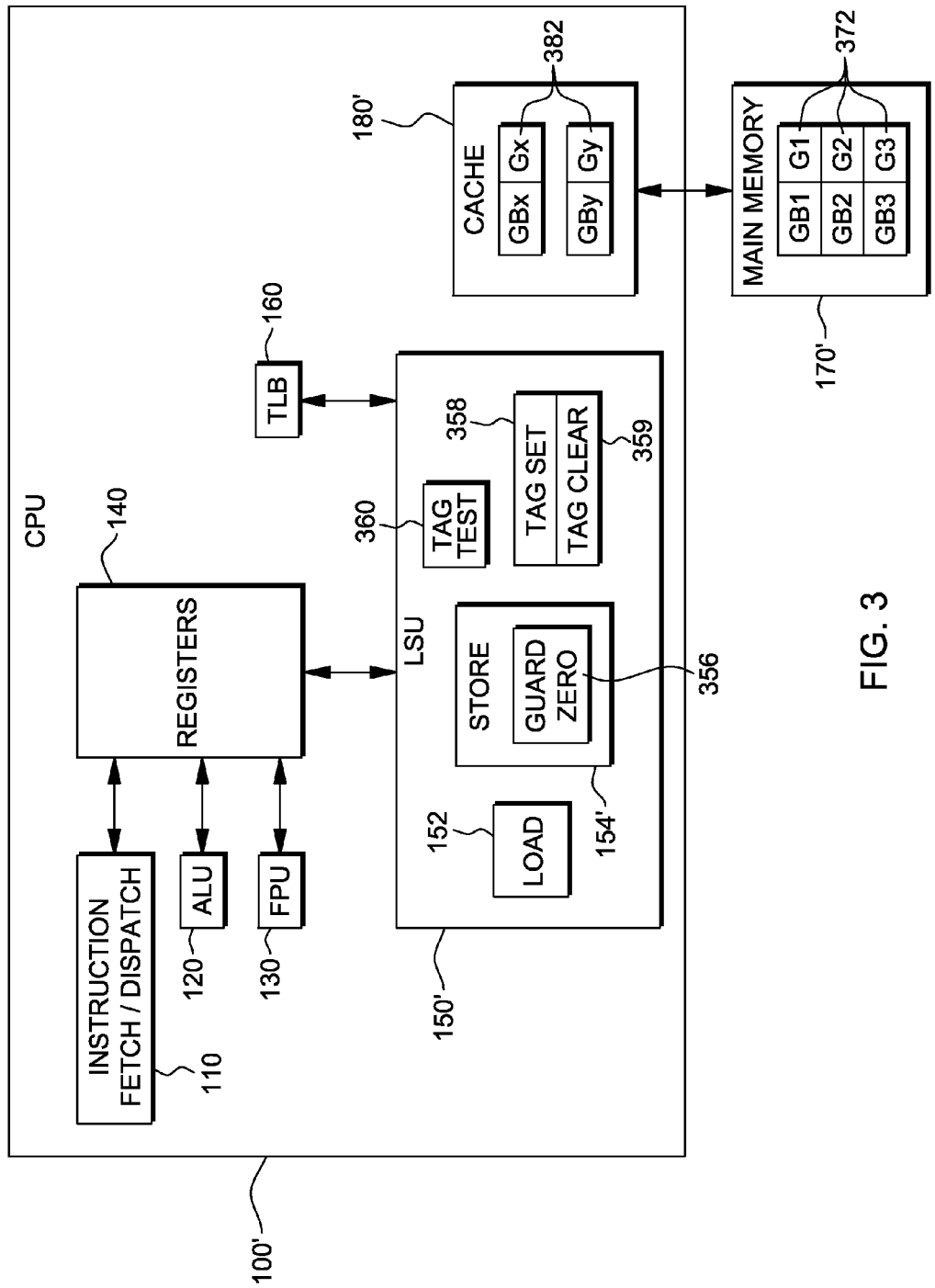
FIG. 3 depicts an example of a computing platform incorporating and using one or more aspects of the present invention.

The computing platform of FIG. 1 can be extended to facilitate aspects of the present invention. In particular, the platform can be extended to provide storage for guard bits, such as discussed above, to provide new CPU instruction(s) for modifying the guard bits, and to modify the store pipeline to modify guard bits when a store operation is performed. FIG. 3 depicts an example of a computing platform of FIG. 1 to incorporate and use one or more aspects of the present invention. FIG. 3 depicts CPU 100', which is similar to CPU 100 of FIG. 1, using similar reference numerals to denote similar components, with only the differences being addressed.

First, storage is supplied for the guard bit(s) associated with each granule of memory. In FIG. 3, main memory 170' comprises granules 372, with each granule 372 having an associated guard bit. That is, granule G1 has an associated guard bit GB1, G2 has an associated guard bit GB2, and granule G3 has an associated guard bit GB3. As noted above, a granule can be of any desirable memory size, for instance as appropriate for the particular computing platform. Data stored in a single memory page could therefore span several granules of memory 372 of that page. Additionally, since (in one embodiment) each granule of memory has its own associated guard bit, granules can be coherency protected independent of coherency protection of other granules in the memory, for example other granules in the same page of memory. In this manner, data stored across granules of memory, including nonconsecutive granules of memory, can be coherency protected without having to indicate that other regions of memory are coherency protected. Granularity can vary across differing computing platforms, however each implementation is likely to support a single granularity, since in various embodiments described herein, dedicated hardware resources are used to support the guard bits. Note also, that as used herein "protected" refers to a data coherency protection mechanism of original data, meaning an indication of coherency with the original data. If original data is indicated as being coherent (i.e. the guard bit indicates coherency with the original data), the original data reliably has remained unchanged, meaning that coherency/consistency exists between the original data and translated data that was translated from the original data when the guard bit was set indicating coherency between the two.

In one implementation, cache 180' contains a processor-local cache of granules 372. As is seen in FIG. 3, cache 180' stores the granules and their associated guard bits. In FIG. 3, cache 180' contains granules Gx and Gy and their associated guard bits GBx and GBy, respectively, in cache lines 382. In one embodiment, the guard bits are obtained transparent to any processing invoked to load the data from main memory into the cache. In this manner, the guard bits are contained in the cache along with the data with which the guard bits are associated, and the guard bits will pass with the granules from/to main memory 170'. If an operating system pages memory to disk, it should ensure that the guard bits are also stored on the disk, so that when the data is paged back, the guard bits can be restored.

There are various options for storing the guard bits associated with granules of memory. In the example of FIG. 3, a guard bit is stored with the original data prepended to its associated granule of memory in main memory 170'. Some memory chips provide error-correcting code (ECC) bits used for error detection and correction, alongside bits used for storing data. In one embodiment, these ECC bits can be repurposed for use as guard bits. Alternatively, cache lines containing data protected with guard bits can be locked into caches, while additional bits can be provided in the cache directory to identify lines that are guarded. This approach removes the need to provide a guard bit in main memory for every protected granule, at the expense of providing additional logic in the cache for handling the guard bits, and limiting the protectable area of memory to that which can be contained within a processor cache. In another example, a physically separate bank of memory could be provided to store the guard bits, for example with one guard bit being provided per granule. In such a case, the separate bank of memory might not be accessible to the address space exposed to software, but instead, hardware could use it internally to maintain and test the guard bits.

According to aspects of the present invention, new Tagset 358 and Tagclear 359 processes are provided that facilitate setting and clearing, respectively, of the guard bits. These processes can be implemented in the LSU 150', such as depicted in FIG. 3.

Figure 4:
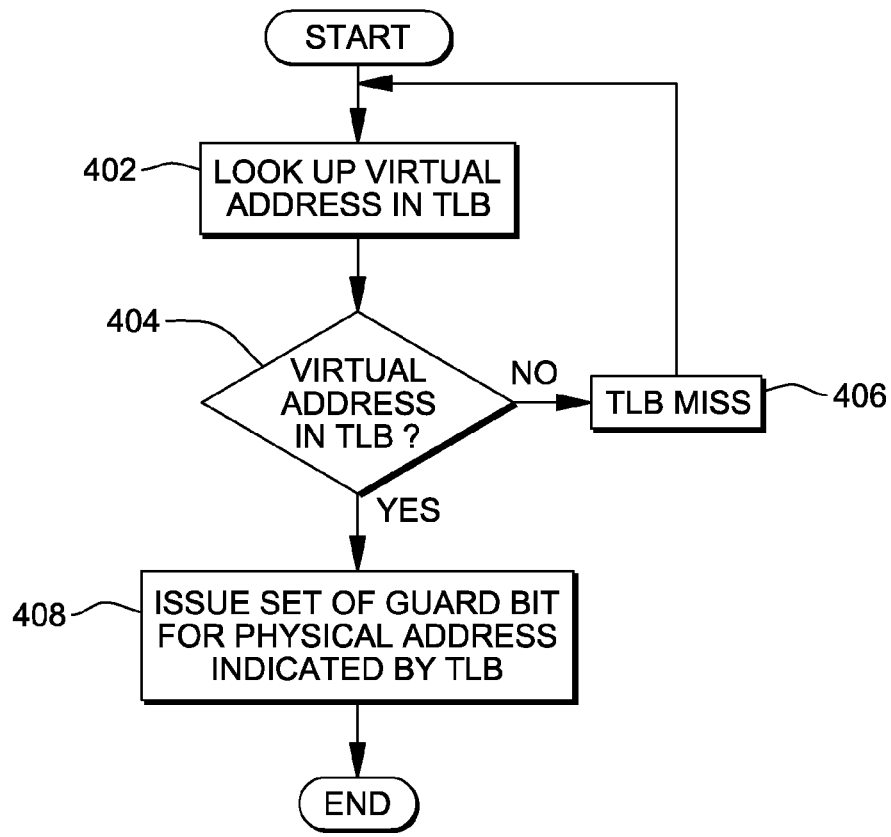
FIG. 4 depicts one example of a process for protecting a granule of memory, in accordance with one or more aspects of the present invention.

FIG. 4 depicts one example of Tagset processing 358 for coherency protecting a granule of memory, in accordance with one or more aspects of the present invention. A granule of memory might be coherency protected when translated data (from original data of the granule) is being created, for instance for placement in some memory. This coherency protection provides an indication of coherency with the original data, when the guard bit is, e.g, SET, and lack of coherency when the guard bit is, e.g., CLEARED. The processing in FIG. 4 begins with a TLB lookup 402 to map a virtual address of the data to a physical address. A check 404 is performed to determine whether the virtual address was found in the TLB, and if a TLB entry was not found, a TLB miss is delivered 406 to the operating system, which updates the TLB and retries the operation. When it is determined 404 that the physical address is available, a SET of the guard bit associated with the granule covering that address is issued 408 to indicate that the granule is protected. Thus, in this embodiment, data is protected at the granule level, meaning that if a memory page is made up of several granules of memory, each granule of that page can be independently indicated as being protected, that is, independent of whether other granules of memory of the page are indicated as being protected.

Figure 5:
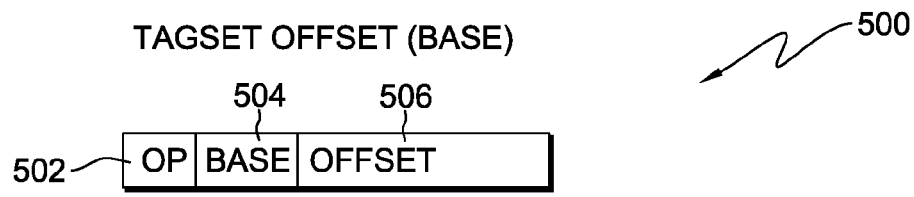
FIG. 5 depicts one example of an instruction for execution to set a guard bit associated with a granule of memory, in accordance with one or more aspects of the present invention.

In one example, a SET of the guard bit associated with a granule of memory is performed via an instruction to SET the guard bit for the physical address indicated in the TLB. FIG. 5 depicts one example of an instruction for execution to SET a guard bit, in accordance with one or more aspects of the present invention.

In FIG. 5, instruction 500 includes one or more opcode fields 502, a BASE field 504 and an OFFSET field 506. Opcode field(s) 502 contain the opcode(s) to uniquely identify the instruction from other instructions. BASE field 504 specifies which of the general-purpose registers of the CPU executing the instruction contains the desired base address to use in identifying the guard bit, and the OFFSET field 506 specifies a signed offset from the base address. In one example, the offset is specified as a number of cache lines.

The execution of instruction 500 follows the logical steps depicted below instruction 500 in FIG. 5. The instruction forms a 128-byte (in one example) aligned address, EA, by adding the contents of the register BASE (or, alternatively, the value 0 if register 0 is specified, in line with POWER® architecture conventions) to the sign-extended OFFSET field 506, which has had several binary zeroes appended to the low-order bits to increase the reach of the OFFSET field. The result of the addition has its low-order seven bits masked out to align the address EA to a 128-byte boundary. This address EA is then used to locate and set the appropriate guard bit, i.e. GUARD (EA)=1.

By way of specific example, in line with the PowerPC® microprocessor architecture (offered by International Business Machines, Inc., Armonk N.Y.), BASE could be represented in an Register instruction field (such as RA, RB, etc.) and OFFSET could be represented in an IMM field.

Tagclear processing 359 (FIG. 3) is, in one embodiment, similar to Tagset processing 358, except that it incorporates a different instruction to CLEAR the guard bit. In one embodiment, this new instruction could be identical to the above-described instruction 500 used in Tagset processing 358, except that it would employ a different opcode(s) 502 (FIG. 5) to identify the instruction for CLEARING the guard bit. The execution of this instruction would be the same as described above except that GUARD (EA)=0, instead of GUARD (EA) =1, would be used to CLEAR the bit. Clearing the bit will have the effect that the guard bit no longer indicates the granule of memory as being protected, with the usefulness of clearing being described below.

In the example of FIG. 3, two different instructions are provided for SETTING and CLEARING the guard bit. However, a person having ordinary skill in the art will recognize that, alternatively, a single instruction could be provided (having its own opcode(s)), with the desired state of the guard bit (i.e., on or off) being specified in some piece of processor state, such as a general-purpose register or a flag bit. In such an example, only one process to SET/CLEAR the guard bit is provided, which sets the guard bit to that state which is indicated by the specified processor state.

As used herein, a reference to SET can refer to setting the bit to either a "zero" or a "one". Likewise, CLEAR can refer to setting the bit to either a "zero" or a "one", as can "setting" a bit, or "clearing" a bit. "Modifying" a guard bit refers to changing the bit from a "one" to a "zero" or changing the bit from a "zero" to a "one".

Additionally, as used herein, "alternative representation" and "translated data" are used synonymously to refer to any translated, transformed, modified, etc. version of some original data from which the translated data was obtained.

Figure 6:
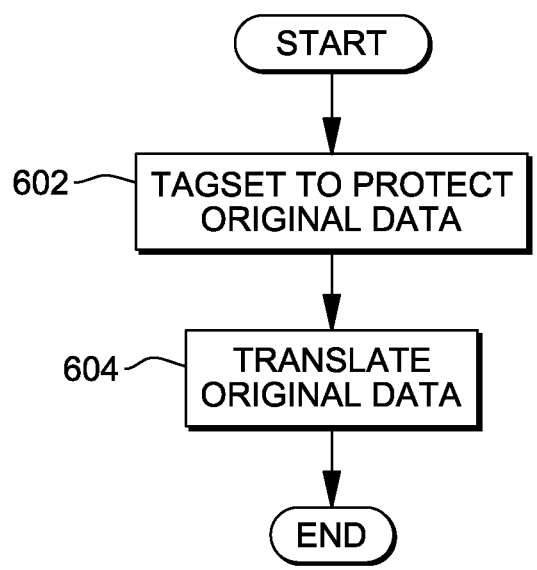
FIG. 6 depicts one example of a process for generating translated data, in accordance with one or more aspects of the present invention.

When a module, such as a processor or software module, generates an alternative representation of original data, e.g. a translation of the original data into translated data, it may be desirable for the module to become aware that the original data has been modified sometime after the alternative representation was obtained but prior to the alternative representation's next use. This facilitates maintaining consistency between the original data, should the original data later be modified, and the alternative representation obtained therefrom. To accomplish this, in accordance with an aspect of the present invention, a guard bit is associated with the original data to indicate that the original data stored in the associated granule of memory is to be coherency protected, that is, to indicate coherency with the original data and facilitate maintaining data coherency between the original data and translated data obtained from the original data. The Tagset processing can be utilized to indicate this protection when one module generates translated data. FIG. 6 depicts one example of a process for generating translated data, in accordance with one or more aspects of the present invention. As the original data is obtained, it is indicated 602 as being protected using the Tagset processing in the LSU. If the original data spans more than one granule of memory, the SETTING the guard bit will be repeated (e.g. the Tagset process is repeated, or the instruction performed for each granule of memory to SET the granule's associated guard bit) so that all granules of memory which the original data spans will be marked as protected by having their associated guard bits set. Note that because only relevant granules of memory (i.e., those storing the original data) are indicated as being protected, other granules of memory not storing the original data need not be indicated as being protected. Protection is thereby indicated on a granule-by-granule basis. After indicating protection of the original data, the original data can be translated 604 to create an alternative representation of the original data, with the translated data being held (for instance) in a cache or other portion of memory.

Depending on the CPU architecture on which this feature is deployed, it may be possible for granules to be modified after the issuing a SET of the guard bit by one module but before this SET is reflected across the entire computing environment. For instance, it may be possible for other modules or CPUs that do not yet have visibility of the new state of the guard bit to modify the granule. Additional steps may therefore be necessary to ensure that the instruction to SET the guard bit has completed and that the new guard bit value is visible to all modules or CPUs in the computing environment before the data can be reliably known to be protected. Consequently, an additional synchronization operation can be provided, the implementation of which could differ considerably on different architectures. In use, when translating data, processing would loop to set the appropriate guard bits associated with the original data (i.e., the guard bits associated with those granules which contain the original data), and then perform a synchronize operation. Upon completing that sequence of operations, the data in those granules can then be reliably read, knowing that their contents will not change without notification.

After a module obtains translated data, it may be desirable for the module to perform a data store operation modifying the original data (for instance in the case of self-modifying code in Dynamic Binary Translation, as an example). For a store operation to complete successfully (i.e., to be "retired"), it is normally sufficient to perform the required access checks, and if the address to be stored to is a valid address to which write access is granted, the instruction can be considered complete, and future instructions can also be retired, even if the data to be stored has not yet updated the actual cache line to which it was targeted.

However, on some architectures, such as the POWER® architecture, store operations are sometimes allowed to be reordered relative to each other, so that a first store to, e.g., a cache line out in main memory may actually complete after a programmatically later store to, e.g., a local cache line. In the case of dynamic binary translation, the rules governing self-modifying code are typically complex, requiring detailed understanding of the instruction set architecture being emulated. In general, if the store were allowed to complete before the dynamic binary translator could invalidate any translations of code in that granule, then it would be possible for the software program being emulated to observe new code in memory via its own read and write operations, but still execute the old code. The effect is essentially to require all stores to complete in-order, and as a result, instruction throughput would be reduced. The present invention avoids these additional store dependencies.

According to aspects of the invention, the above inefficiency is overcome by providing additional handling when a module (such as one that has translated original data into an alternative representation thereof) is performing a data store operation, and when a module attempts to access translated data obtained from original data. More specifically, the store operation of the processor's LSU is modified to ensure that the guard bit associated with the granule(s) of memory affected by the store operation is modified commensurate with modification of the original data stored in those granule(s). When the original data stored in a protected granule is modified, this introduces a lack of coherency with the original data, both between the original data as modified and the previous version of the original data, and between the original data as modified and translated data that was translated from the prior version of the original data. Modifying the guard bit(s) associated with the granule(s) in which the original data is stored indicates that translated data obtained from the original data prior to the modification is now inconsistent and not coherent with the original data, after the data store operation completes.

Additionally, as a module attempts to access and use translated data which was obtained from some original data, it should be ascertained prior to actually using that translated data whether the guard bits associated with the original data indicates coherency with the original data, e,g, indicates whether the translated data is coherent with the original data from which it was obtained. If the guard bit indicates lack of coherency, the translated data is discarded and the module can retranslate the data, to facilitate maintaining data coherency between the translated data and the original data. The guard bit associated with the granule of memory containing the original data could then be re-SET to again coherency protect the granule, if desired.

Figure 7:
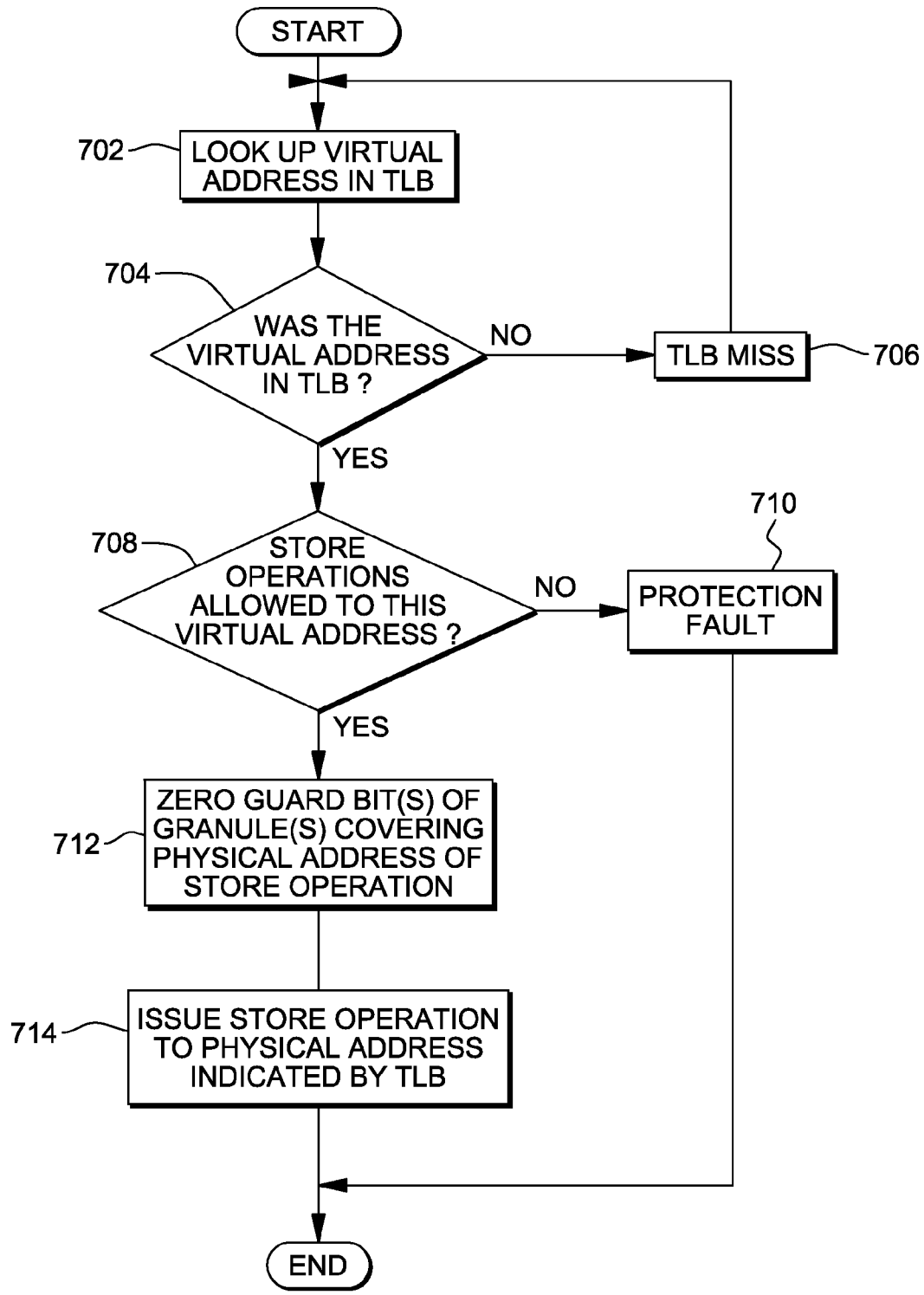
FIG. 7 depicts one example of a store operation incorporating a guard zero process, in accordance with one or more aspects of the present invention.

To facilitate this additional handling, CPU 100' (FIG. 3) further includes a Guard Zero process 356 provided in a modified store operation 154' of the LSU. Guard Zero process 356 is performed on every store operation, in one embodiment. FIG. 7 depicts one example of a store operation incorporating a Guard Zero process 356, in accordance with one or more aspects of the present invention. The Guard Zero process extends the store operation described above with reference to FIG. 2. The store operation behaves as before except with the addition of an extra store.

As before, the store operation is issued to a specific virtual address which initiates a lookup 702 in the TLB for the virtual-to-physical mapping to obtain an equivalent physical address. The store operation determines 704 whether the virtual address appears in the TLB, and if the virtual address is not in the TLB, a TLB miss 706 results, after which the operation is reinitiated as described above. When a TLB mapping is found 704, the processing determines 708 whether store operations are allowed to the virtual address. If they are not, a protection fault is delivered 710.

If a TLB mapping is found and the store is known to be issuable, then the Guard Zero process is triggered 712 to modify the guard bit(s) associated with the granule(s) that will be modified as a result of this store operation—in this example, the guard bit(s) are zeroed. It is possible that a store operation modifies data that spans multiple granules of memory, depending on the size of the granules and the size of the data being modified by the store operation.

After the relevant guard bit(s) are modified (zeroed in this example), the store is issued 714 to the physical address indicated by the TLB, as before (FIG. 2).

In conjunction with the modified data store operation, TAGTEST processing 360 is provided in the load/store unit. Prior to some cached data being used, TAGTEST processing is performed to check that the guard bits associated with the original data are still set. If they are not (because they were cleared, either by a TAGCLEAR instruction or the Guard Zero operation on a store to the granule), this indicates a lack of coherency with the original data, and the TAGTEST processing indicates this, and control can be transferred to a routine to discard the translated data so as to facilitate maintaining data coherency between the translated data and the original data.

Figure 8:
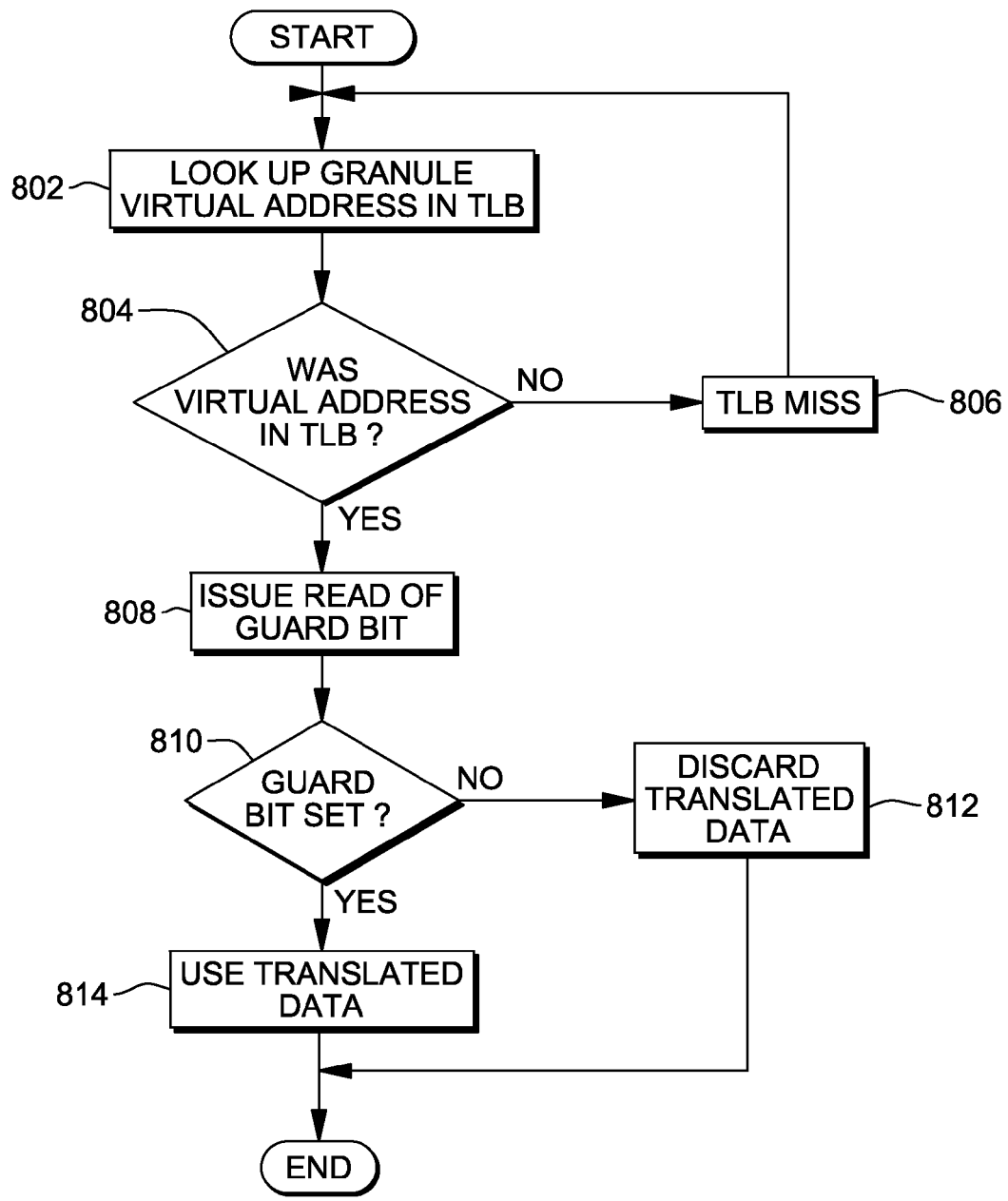
FIG. 8 depicts one example of TAGTEST processing, in accordance with one or more aspects of the present invention.

FIG. 8 depicts one example of TAGTEST processing, in accordance with one or more aspects of the present invention. TAGTEST processing is similar to a standard load operation. It performs a TLB lookup 802, determines 804 whether the virtual address mapping exists in the TLB, and traps 806 into the TLB Miss handler if a mapping does not exist. Once a mapping exists, instead of returning the contents of a memory location, it returns the guard bit for the granule by issuing 808 a read of the guard bit. Then, it is determined 810 whether the guard bit is set. If the guard bit is set, then the translated data can be used 814, because the guard bit being set indicates coherency with the original data (for instance that it has not been modified by, e.g., a store operation) since the original data was translated. However, if the guard bit is not set (for instance, the granule has either had its guard bit cleared by a TAGCLEAR process, or implicitly cleared by a Guard Zero operation), this indicates lack of coherency with the original data. In this case, the translated data is inconsistent with the original data, which has been, for instance, modified since the translated data was obtained from the (pre-modification) original data. Discarding the translated data can be initiated 812, using, for instance, existing processor instructions to transfer control to a modification handling routine.

The above TAGTEST processing can, in one example, execute a Tagtest instruction one or more times to check the relevant granule(s)' guard bits. The Tagtest instruction checks at least one granule's guard bit and indicates the result.

Figure 9A:
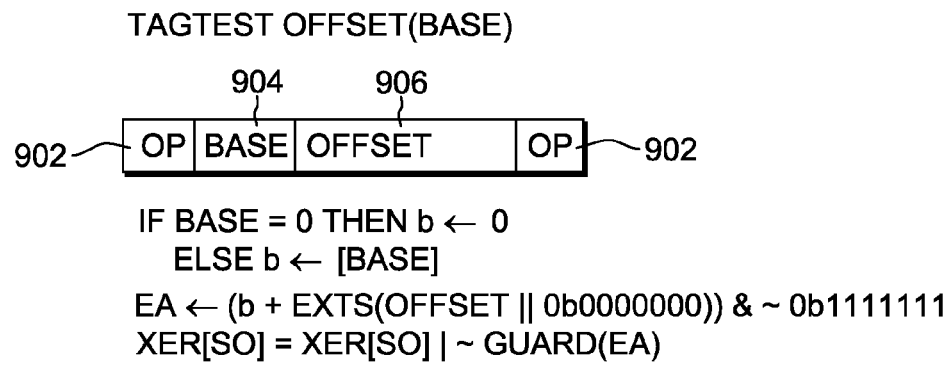
FIGS. 9A-9C depict examples of Tagtest instructions for checking a guard bit, in accordance with an aspect of the present invention.
Figure 9B:
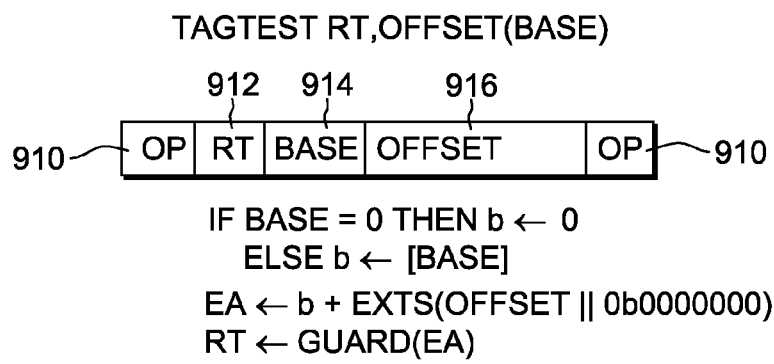
Figure 9C:
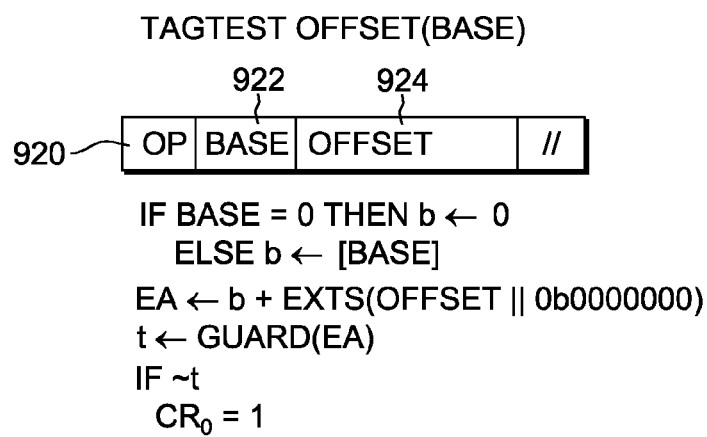

FIGS. 9A-9C depict examples of Tagtest instructions for checking a guard bit. In FIG. 9A, the instruction includes one or more opcode fields 902, a BASE field 904 and an OFFSET field 906. Opcode fields 902 contain the opcode(s) to uniquely identify the instruction from other instructions. BASE field 904 specifies which of the general-purpose registers of the CPU executing the instruction contains the desired base address to use in identifying the guard bit, and the OFFSET field 906 specifies a signed offset from the base address. In one example, the offset is specified as a number of cache lines.

The execution of the instruction follows the logical steps depicted below the Tagtest instruction in FIG. 9A. The instruction forms a 128-byte (in one example) aligned address, EA, by adding the contents of the register indicated in the BASE field 904 (or, alternatively, the value 0 if register 0 is specified, in line with POWER® architecture conventions) to the sign-extended OFFSET field 906, which has had several binary zeroes appended to the low-order bits to increase the reach of the OFFSET field. The result of the addition has its low-order seven bits masked out to align the address EA to a 128-byte boundary. This address is then used to retrieve the appropriate guard bit, which is negated and ORed into the Summary Overflow (SO) bit of a register, in this example the XER register on the POWER® architecture.

The effect of this is that a program/module/processor performing the TAGTEST operation can clear the XER[SO] bit, perform a sequence of one or more Tagtest instructions such as above, and then test the XER[SO] bit. A value of 1 indicates that at least one guard bit that was checked was not set, and thus lack of coherency is indicated.

FIG. 9B depicts an alternative Tagtest instruction. This alternative instruction might be advantageous over the instruction of FIG. 9A on some architectures in the case where the architecture does not have a Summary Overflow bit, as was in the above Tagtest instruction.

In FIG. 9B, the Tagtest instruction includes opcode(s) 910, BASE and OFFSET fields 914 and 916, respectively (as in FIG. 9A) and also an RT field 912 specifying a general purpose register for holding the retrieved tag. The instruction loads the tag bit of the specified cache line into a register specified by RT. In one particular embodiment, the instruction uses the same instruction opcode as an ldq instruction, which might exist as a privileged mode operation on some architectures. However, the Tagtest instruction of FIG. 9B would only need to be executable from nonpriviledged code.

The execution of the instruction follows the logical steps depicted below the instruction in FIG. 9B. The instruction forms a 128-byte (in one example) aligned address, EA, by adding the contents of the register indicated in the BASE field 914 (or, alternatively, the value 0 if register 0 is specified, in line with POWER® architecture conventions) to the sign-extended OFFSET field 916, which has had several binary zeroes appended to the low-order bits to increase the reach of the OFFSET field. This address is then used to retrieve the appropriate guard bit, for placement in the register specified by the RT field 912.

In one embodiment, the above instruction may be advantageously employed as follows:

```
//Assume that r3 contains the address of cache line 1 ("CL/1")
tagload r1, 0(r3)        //Load CL/1 tag into r1
tagload r2, 128(r3)      //Load CL/2 tag into r2
and r1, r1, r2           //and r1 with r2, result in r1
tdnei r1, 1              //trap if r1 is not equal to 1
```

FIG. 9C depicts yet another alternative Tagtest instruction. In FIG. 9C, the Tagtest instruction includes opcode 920, and BASE and OFFSET fields 922 and 924, respectively (as in FIG. 9A). The instruction inspects the guard bit of the specified cache line, and sets bit 0 of a Condition Register to 1 if the guard bit was not set. It could use the same instruction opcode as an ldq instruction, in one example, which might exist as a privileged mode operation on some architectures. However, the Tagtest instruction of FIG. 9C would only need to be executable from nonpriviledged code.

The execution of the instruction follows the logical steps depicted below the instruction in FIG. 9C. The instruction forms a 128-byte (in one example) aligned address, EA, by adding the contents of the register indicated in the BASE field 922 (or, alternatively, the value 0 if register 0 is specified, in line with POWER® architecture conventions) to the sign-extended OFFSET field, which has had several binary zeroes appended to the low-order bits to increase the reach of the OFFSET field. This address is then used to retrieve the appropriate guard bit as 't'. 't' is then inspected, and Condition Register is set to 1 (in this example) if the guard bit is not set.

This behavior allows a series of tag bits across different cache lines to be efficiently tested to see if any of them are cleared as follows:

```
//Assume that r1 contains the address of CL/1
crclr lt              //clear the LT bit of CR0 (CR bit zero)
tagtest 0(r1)         //load the tag bit from CL/1 and set bit 0 of CR if tag is 0
tagtest 128(r1)       //load the tag bit from CL/2 and set bit 0 of CR if tag is 0
bltla                 //jump-and-link to handler if bit 0 of CR is set
mod_detected
```

On some architectures, the Tagtest instruction is more desirable than the Tagtest instruction of FIG. 9B, for example because: fewer general purpose registers are used in the calculation, leaving them free to be used for other operations; since no destination general purpose register RT needs to be specified, the immediate field can be larger; fewer instructions are required to perform the tests; and because executions of the Tagtest instruction of FIG. 9C can be performed out-of-order with no data dependencies between them, whereas the Tagtest instruction of FIG. 9B cannot because it builds up the final test value using 'and' operations that introduce dependencies. Behavior of the Tagtest instruction of FIG. 9C is, in one embodiment, analogous to how the summary overflow (SO) bit is maintained during the execution of operations that may set it.

It should be noted that it would also be acceptable for the Tagtest instruction of FIG. 9C to set a Summary Overflow bit rather than a condition field bit, if the implementation required it. However, the Summary Overflow bit would need to be cleared on entry to the code block, and an additional operation (e.g. CMPI operation) might be required to move the Summary Overflow bit into the Condition Register in preparation for the branch.

The Tagtest instruction checks at least one granule's guard bit and indicates the result. Some examples above show a simple implementation in which only a single granule is tested at once. However, it should be understood that this instruction could be enhanced to allow a range or set of granules to be tested in parallel (perhaps via multiple executions of the Tagtest instruction), with an aggregated value returned (i.e. "tell me if any of these granules have their guard bits cleared"). Tagtest instructions in a deployment on the POWER® architecture and with a granule size of 128 bytes are provided herein as examples in the above instructions, however a person having ordinary skill in the art will recognize that modifications may be made for other architectures, and that these modifications are within the scope of the present invention.

When a module initiating a TAGTEST operation (FIG. 8) determines, after checking the at least one guard bit, that the original data has been modified, the module can generate replacement translated data using the modified version of the original data and/or use Tagset to reprotect the original data, if so desired. The module may then access the newly translated data knowing that it is coherent and consistent with the original data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
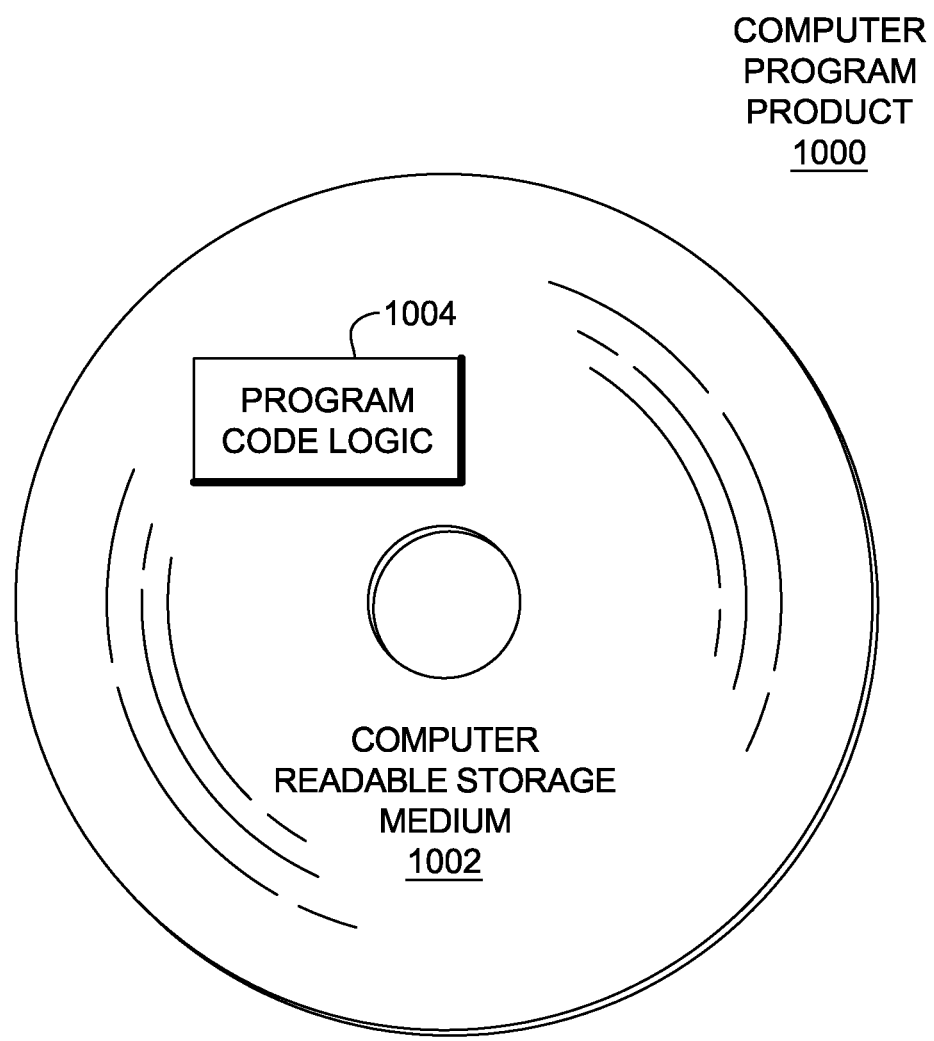
FIG. 10 depicts one embodiment of a computer program product incorporating one or more aspects of the present invention.

Referring to FIG. 10, in one example, a computer program product 1000 includes, for instance, one or more computer readable storage media 1002 to store computer readable program code means or logic 1004 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

A data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
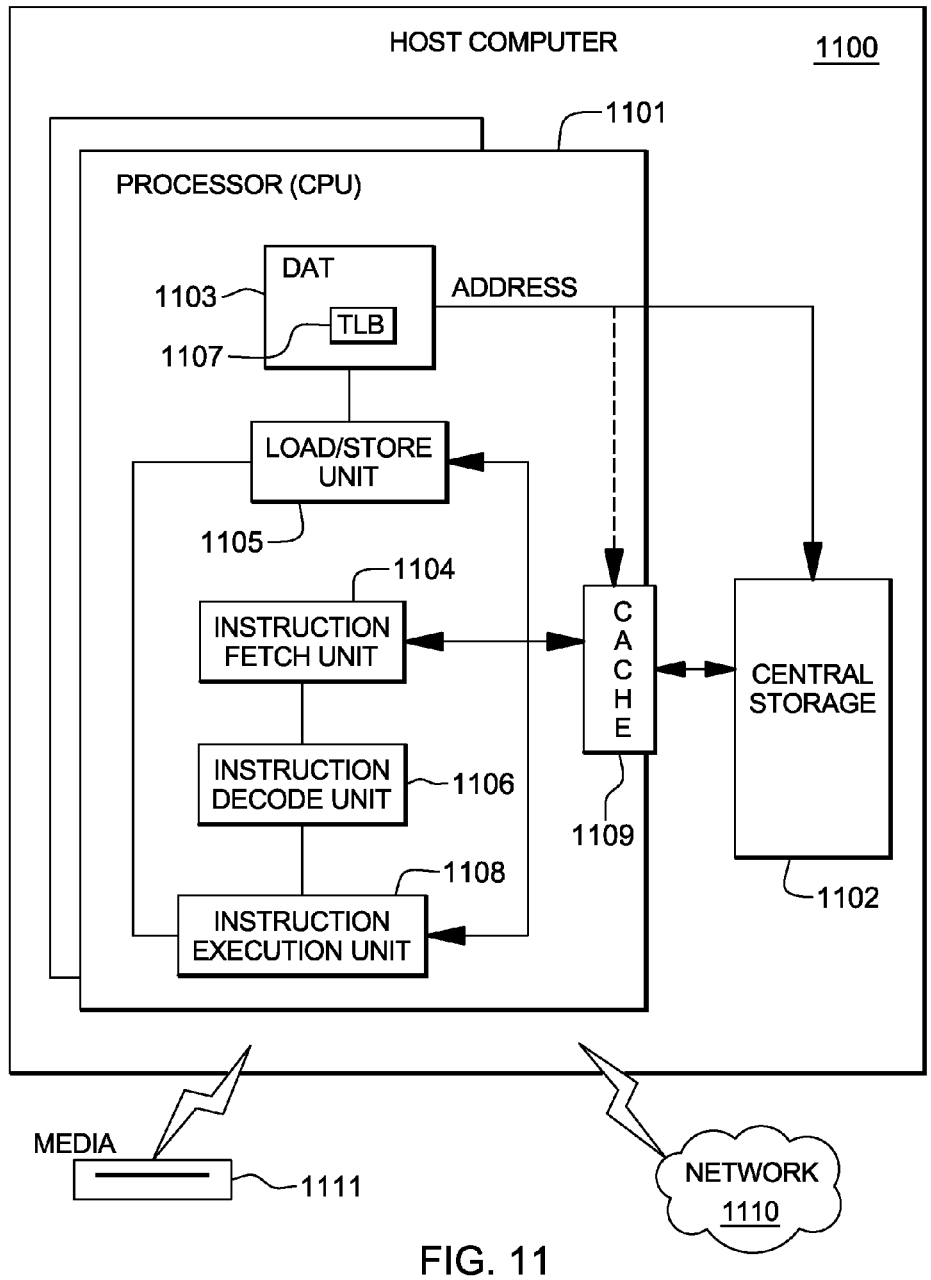
FIG. 11 depicts one embodiment of a host computer system to incorporate and use one or more aspects of the present invention.

Referring to FIG. 11, representative components of a Host Computer 1100 to implement one or more aspects of the present invention are portrayed. The representative host computer 1100 comprises one or more CPUs 1101 in communication with central storage 1102 (i.e., computer memory), as well as I/O interfaces to storage media devices 1111 and networks 1110 for communicating with other computers or SANs and the like. The CPU 1101 is compliant with an architecture having an architected instruction set and architected functionality. The CPU 1101 may have dynamic address translation (DAT) 1103 for transforming program addresses (virtual addresses) into real addresses of memory. A DAT typically includes a translation lookaside buffer (TLB) 1107 for caching translations so that later accesses to the block of central storage 1102 do not require the delay of address translation. Typically, a cache 1109 is employed between central storage 1102 and the processor 1101. The cache 1109 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from central storage 1102 by an instruction fetch unit 1104 via a cache 1109. The instruction is decoded in an instruction decode unit 1106 and dispatched (with other instructions in some embodiments) to instruction execution unit or units 1108. Typically several execution units 1108 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from central storage 1102, a load/store unit 1105 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs must be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, a group of bytes in storage is addressed by the leftmost byte of the group. The number of bytes in the group is either implied or explicitly specified by the operation to be performed. When used in a CPU operation, a group of bits and/or bytes is called a field. Within each group of bytes, bits are numbered in a left-to-right sequence.

The leftmost bits are sometimes referred to as the "high-order" bits and the rightmost bits as the "low-order" bits. Bit numbers are not storage addresses, however. Only bytes can be addressed. To operate on individual bits of a byte in storage, it is necessary to access the entire byte. The bits in a byte are numbered 0 through 7, from left to right. The bits in an address may be numbered 8-31 or 40-63 for 24-bit addresses or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte. When information is placed in storage, the contents of only those byte locations are replaced that are included in the designated field, even though the width of the physical path to storage may be greater than the length of the field being stored.

Certain units of information must be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions must be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 11, software program code which embodies the present invention is typically accessed by the processor 1101 of the host computer 1100 from long-term storage media devices 1111, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory or central storage 1102 of one computer system over a network 1110 to other computer systems for use by users of such other systems.

The software program code includes an operating system which controls the function and interaction of the various computer components and one or more application programs. Program code is normally paged from storage media device 1111 to the relatively higher-speed central storage 1102 where it is available for processing by the processor 1101. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
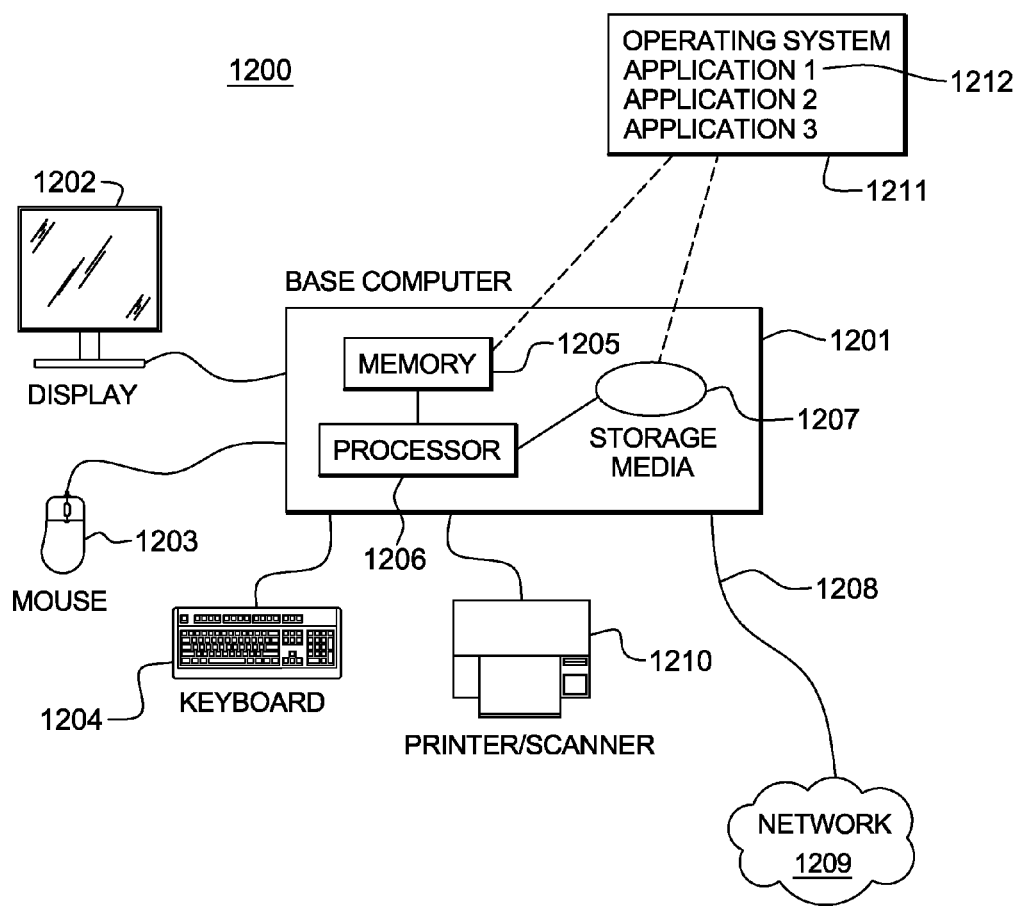
FIG. 12 depicts a further example of a computer system to incorporate and use or more aspects of the present invention.

FIG. 12 illustrates a representative workstation or server hardware system in which the present invention may be practiced. The system 1200 of FIG. 12 comprises a representative base computer 1201, such as a personal computer, a workstation or a server, including optional peripheral devices. The base computer 1201 includes one or more processors 1206 and a bus employed to connect and enable communication between the processor(s) 1206 and the other components of the base computer 1201 in accordance with known techniques. The bus connects the processor 1206 to memory 1205 and long-term storage media 1207 which can include a hard drive (including any of magnetic media, CD, DVD and Flash Memory for example) or a tape drive for example. The base computer 1201 might also include a user interface adapter, which connects the microprocessor 1206 via the bus to one or more interface devices, such as a keyboard 1204, a mouse 1203, a printer/scanner 1210 and/or other interface devices, which can be any user interface device, such as a touch sensitive screen, digitized entry pad, etc. The bus also connects a display device 1202, such as an LCD screen or monitor, to the microprocessor 1206 via a display adapter.

The base computer 1201 may communicate with other computers or networks of computers by way of a network adapter capable of communicating 1208 with a network 1209. Example network adapters are communications channels, token ring, Ethernet or modems. Alternatively, the base computer 1201 may communicate using a wireless interface, such as a CDPD (cellular digital packet data) card. The base computer 1201 may be associated with such other computers in a Local Area Network (LAN) or a Wide Area Network (WAN), or the base computer 1201 can be a client in a client/server arrangement with another computer, etc. All of these configurations, as well as the appropriate communications hardware and software, are known in the art.

Figure 13:
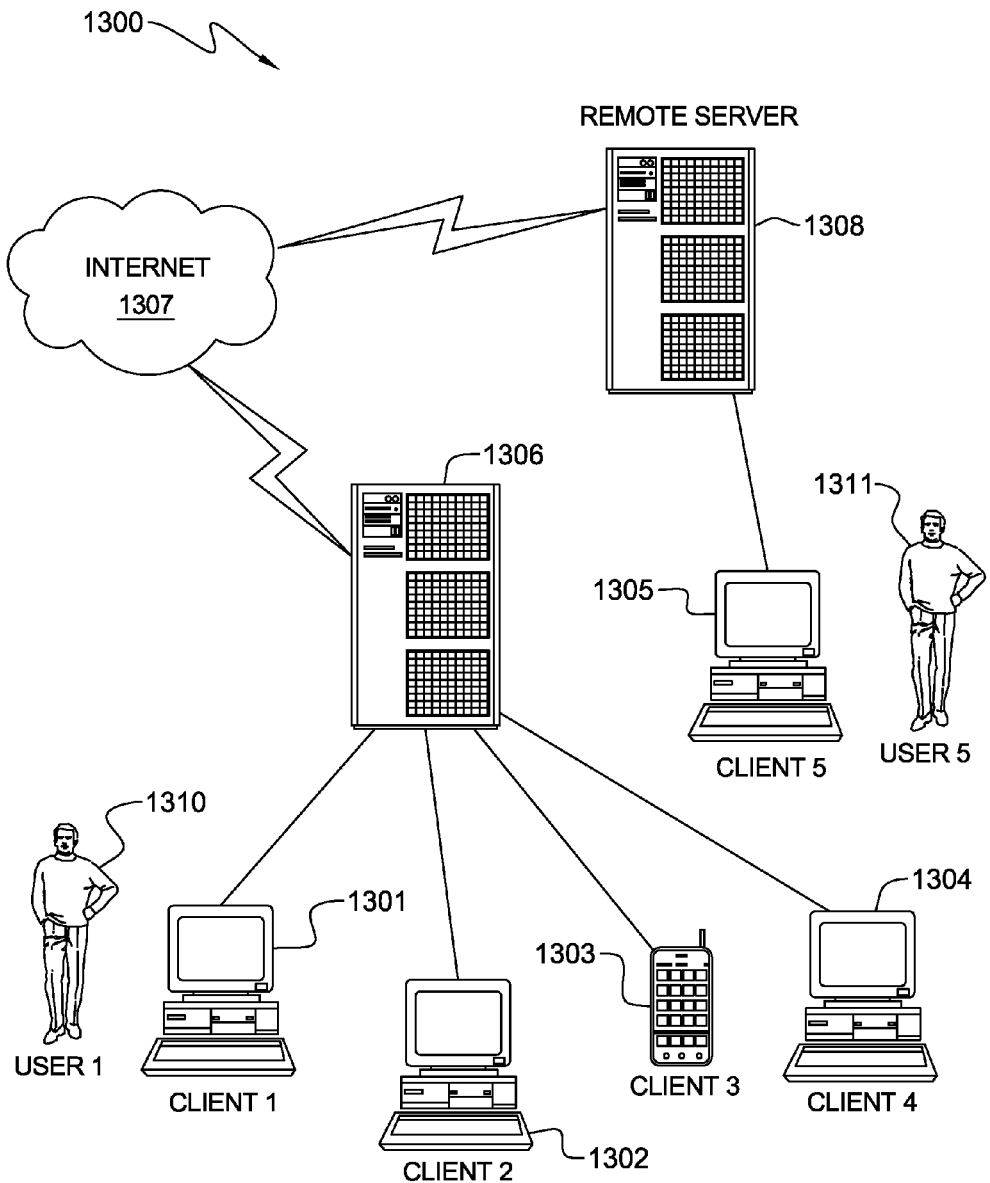
FIG. 13 depicts another example of a computer system comprising a computer network, to incorporate and use one or more aspects of the present invention.

FIG. 13 illustrates a data processing network 1300 in which the present invention may be practiced. The data processing network 1300 may include a plurality of individual networks, such as a wireless network and a wired network, each of which may include a plurality of individual workstations 1301, 1302, 1303, 1304. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer 1306 or application server (remote server 1308 which may access a data repository and may also be accessed directly from a workstation 1305). A gateway computer 1306 serves as a point of entry into each individual network. A gateway is needed when connecting one networking protocol to another. The gateway computer 1306 may be preferably coupled to another network (the Internet 1307 for example) by means of a communications link. The gateway computer 1306 may also be directly coupled to one or more workstations 1301, 1302,

1303, 1304 using a communications link. The gateway computer 1306 may be implemented utilizing an IBM eServer™ zSeries® z9® Server available from IBM Corp.

Referring concurrently to FIG. 12 and FIG. 13, software programming code which may embody the present invention may be accessed by the processor 1206 of the base computer 1201 from long-term storage media 1207, such as a CD-ROM drive or hard drive. The software programming code may be embodied on any of a variety of known media for use with a data processing system, such as a diskette, hard drive, or CD-ROM. The code may be distributed on such media, or may be distributed to users 1310, 1311 from the memory or storage of one computer system over a network to other computer systems for use by users of such other systems.

Alternatively, the programming code may be embodied in the memory 1205, and accessed by the processor 1206 using the processor bus. Such programming code includes an operating system which controls the function and interaction of the various computer components and one or more application programs 1212. Program code is normally paged from storage media 1207 to high-speed memory 1205 where it is available for processing by the processor 1206. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
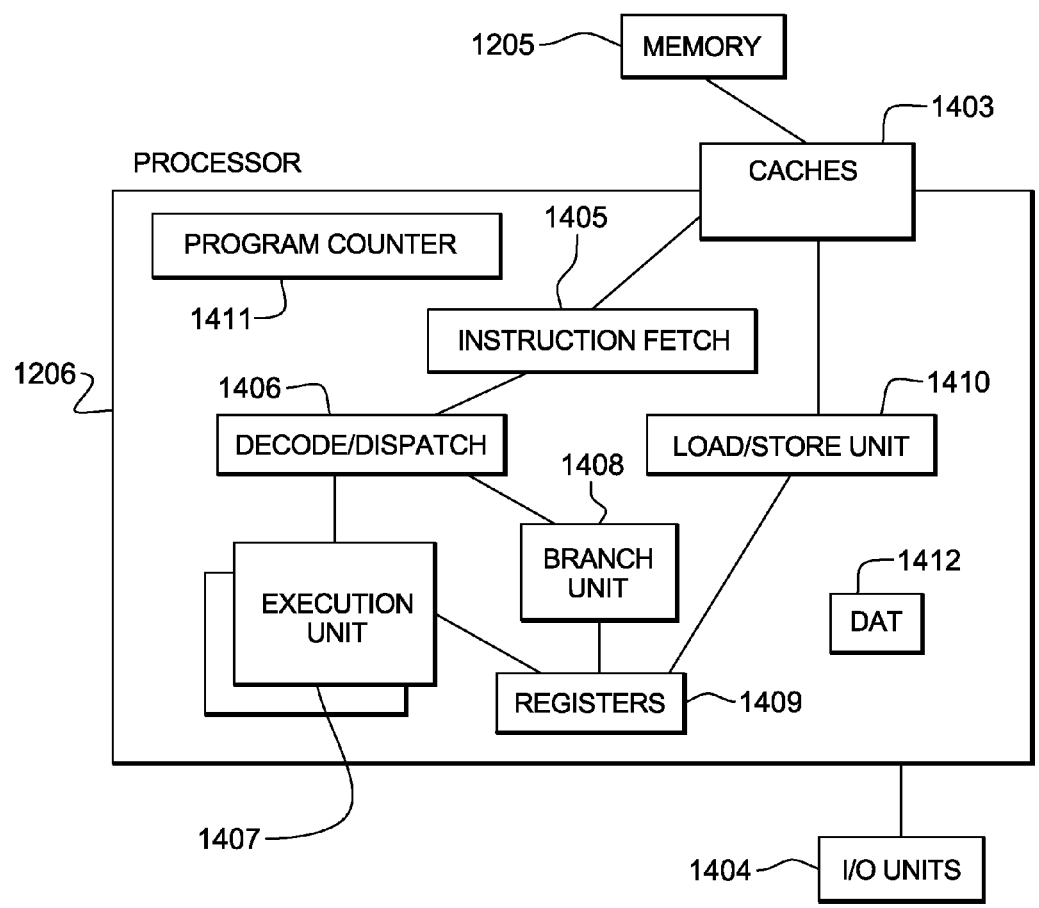
FIG. 14 depicts one embodiment of various elements of a computer system to incorporate and use one or more aspects of the present invention.

Referring to FIG. 14, an exemplary processor embodiment is depicted for processor 1206. Typically one or more levels of cache 1403 are employed to buffer memory blocks in order to improve processor performance. The cache 1403 is a high speed buffer holding cache lines of memory data that are likely to be used. Typical cache lines are 64, 128 or 256 bytes of memory data. Separate caches are often employed for caching instructions than for caching data. Data or Cache coherence (synchronization of copies of lines in memory and the caches) is often provided by various "snoop" algorithms well known in the art. Main memory storage 1205 of a processor system is often referred to as a cache. In a processor system having 4 levels of cache 1403, main storage 1205 is sometimes referred to as the level 5 (L5) cache since it is typically faster and only holds a portion of the non-volatile storage (DASD, Tape etc) that is available to a computer system. Main storage 1205 "caches" pages of data paged in and out of the main storage 1205 by the Operating system.

A program counter (instruction counter) 1411 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 1411 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 1411.

Typically an instruction fetch unit 1405 is employed to fetch instructions on behalf of the processor 1206. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 1206. In an embodiment, the fetched instruction(s) are passed to a dispatch unit 1406 of the fetch unit. The dispatch unit decodes the instruction(s) and forwards information about the decoded instruction(s) to appropriate units 1407, 1408, 1410. An execution unit 1407 will typically receive information about decoded arithmetic instructions from the instruction fetch unit 1405 and will perform arithmetic operations on operands according to the opcode of the instruction. Operands are provided to the execution unit 1407 preferably either from memory 1205, architected registers 1409 or from an immediate field of the instruction being executed. Results of the execution, when stored, are stored either in memory 1205, registers 1409 or in other machine hardware (such as control registers, PSW registers and the like).

Figure 15A:
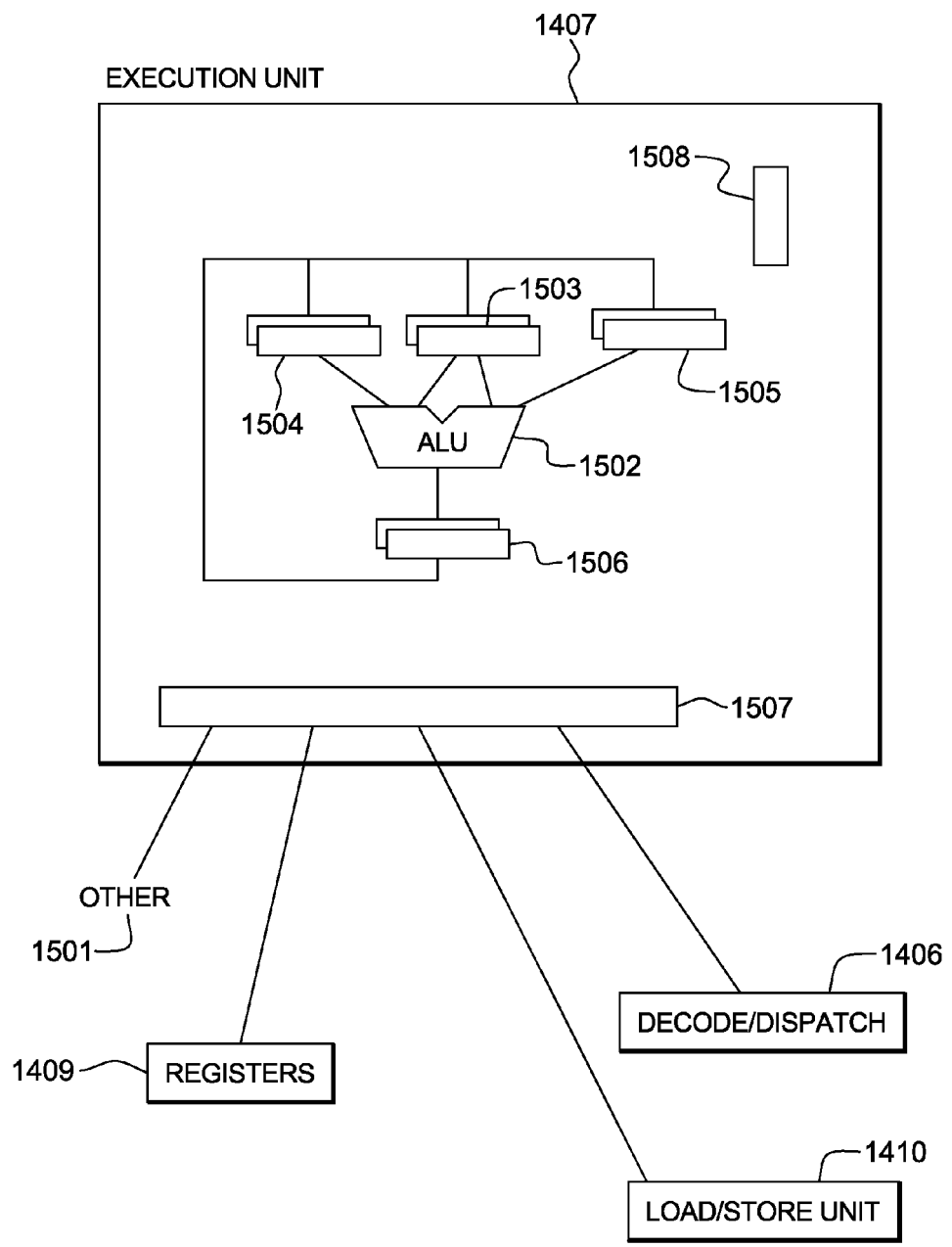
FIG. 15A depicts one embodiment of the execution unit of the computer system of FIG. 14, to incorporate and use one or more aspects of the present invention.

A processor 1206 typically has one or more execution units 1407, 1408, 1410 for executing the function of the instruction. Referring to FIG. 15A, an execution unit 1407 may communicate with architected general registers 1409, a decode/dispatch unit 1406, a load store unit 1410, and other 1501 processor units by way of interfacing logic 1507. An execution unit 1407 may employ several register circuits 1503, 1504, 1505 to hold information that the arithmetic logic unit (ALU) 1502 will operate on. The ALU performs arithmetic operations such as add, subtract, multiply and divide as well as logical function such as "and", "or", and "exclusive-or" (XOR), rotate and shift. Preferably the ALU supports specialized operations that are design dependent. Other circuits may provide other architected facilities 1508 including condition codes and recovery support logic for example. Typically the result of an ALU operation is held in an output register circuit 1506 which can forward the result to a variety of other processing functions. There are many arrangements of processor units, the present description is only intended to provide a representative understanding of one embodiment.

An ADD instruction for example would be executed in an execution unit 1407 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 1407 on operands found in two registers 1409 identified by register fields of the instruction.

The execution unit 1407 performs the arithmetic addition on two operands and stores the result in a third operand where the third operand may be a third register or one of the two source registers. The execution unit preferably utilizes an Arithmetic Logic Unit (ALU) 1502 that is capable of performing a variety of logical functions such as Shift, Rotate, And, Or and XOR as well as a variety of algebraic functions including any of add, subtract, multiply, divide. Some ALUs 1502 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Figure 15B:
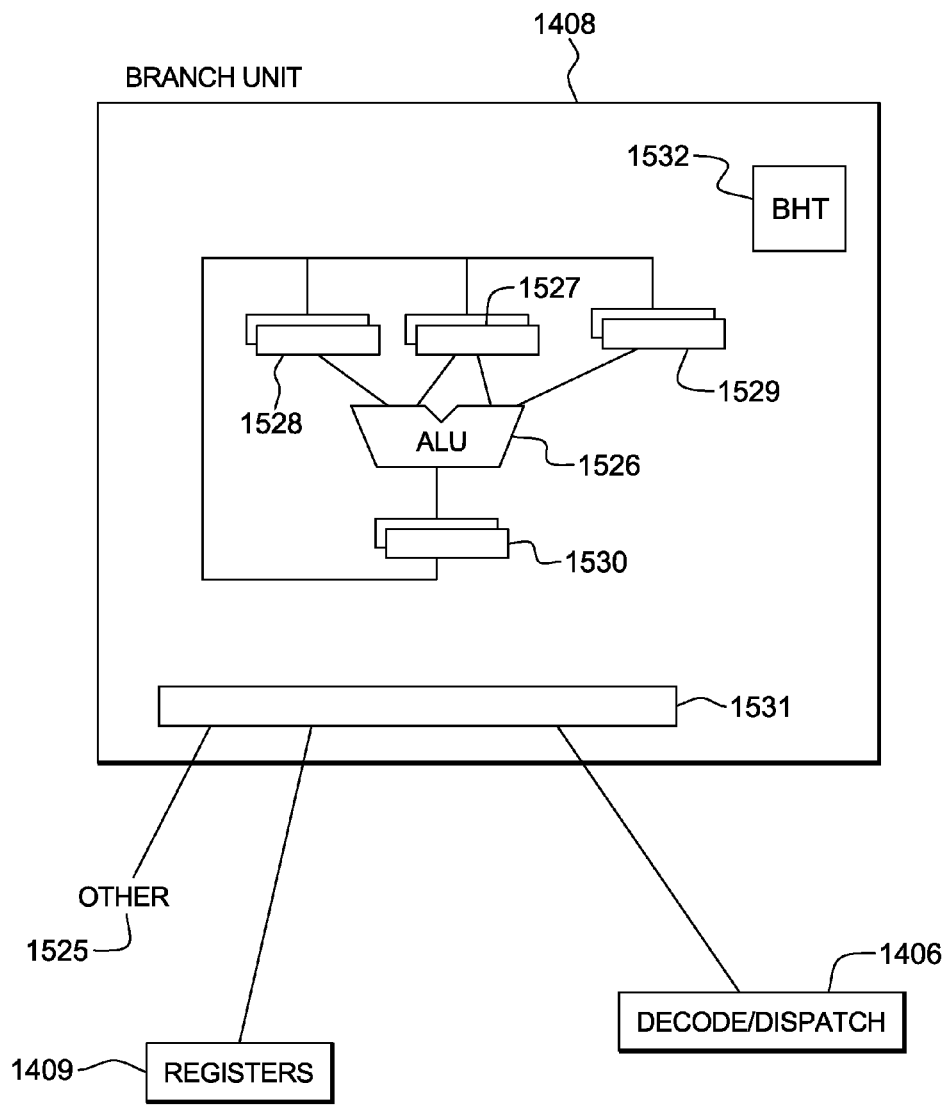
FIG. 15B depicts one embodiment of the branch unit of the computer system of FIG. 14, to incorporate and use one or more aspects of the present invention.

Referring to FIG. 15B, branch instruction information for executing a branch instruction is typically sent to a branch unit 1408 which often employs a branch prediction algorithm such as a branch history table 1532 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 1408 may employ an ALU 1526 having a plurality of input register circuits 1527, 1528, 1529 and an output register circuit 1530. The branch unit 1408 may communicate with general registers 1409, decode dispatch unit 1406 or other circuits 1525 for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment) for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an Index register and an immediate field (displacement field) that are added together to provide the address of the operand in memory for example. Location herein typically implies a location in main memory (main storage) unless otherwise indicated.

Figure 15C:
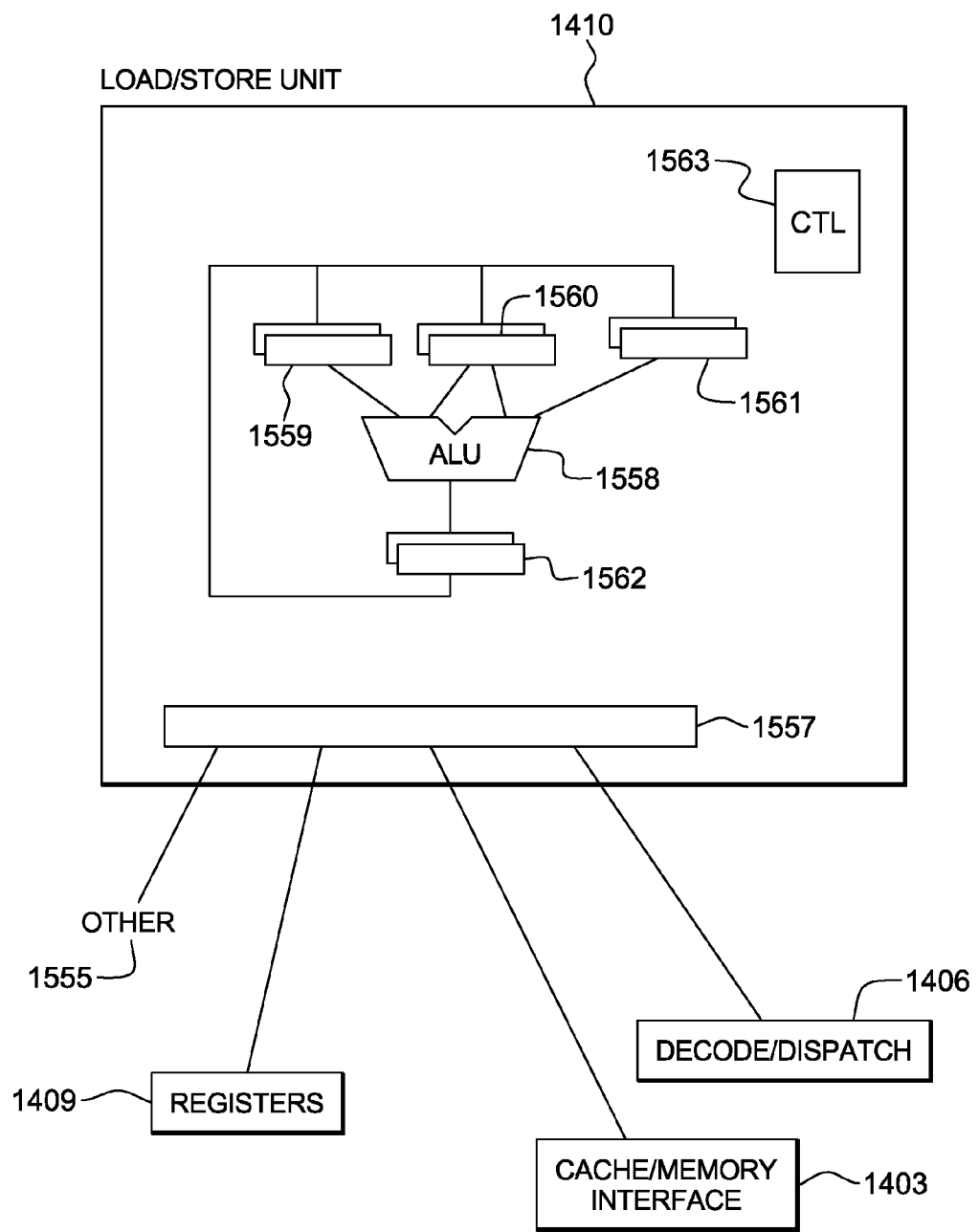
FIG. 15C depicts one embodiment of the load/store unit of the computer system of FIG. 14, to incorporate and use one or more aspects of the present invention.

Referring to FIG. 15C, a processor accesses storage using a load/store unit 1410. The load/store unit 1410 may perform a load operation by obtaining the address of the target operand in memory 1403 and loading the operand in a register 1409 or another memory 1403 location, or may perform a store operation by obtaining the address of the target operand in memory 1403 and storing data obtained from a register 1409 or another memory 1403 location in the target operand location in memory 1403. The load/store unit 1410 may be speculative and may access memory in a sequence that is out-of-order relative to instruction sequence, however the load/store unit 1410 must maintain the appearance to programs that instructions were executed in order. A load/store unit 1410 may communicate with general registers 1409, decode/dispatch unit 1406, cache/memory interface 1403 or other elements 1555 and comprises various register circuits, ALUs 1558 and control logic 1563 to calculate storage addresses and to provide pipeline sequencing to keep operations in-order. Some operations may be out of order but the load/store unit provides functionality to make the out of order operations to appear to the program as having been performed in order as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to simply prefixing a virtual address with an offset value, translating the virtual address via one or more translation tables, the translation tables preferably comprising at least a segment table and a page table alone or in combination, preferably, the segment table having an entry pointing to the page table. In z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources such as I/O, caches, TLBs and memory interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 1404 (FIG. 14) provide the processor with means for attaching to peripheral devices including tape, disc, printers, displays, and networks for example. I/O units are often presented to the computer program by software drivers. In mainframes such as the z/Series® from IBM, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers often by way of a compiler application. These instructions stored in the storage medium may be executed natively in a z/Architecture® IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Aspects of the present invention can be applied to facilitate maintaining coherency between the converted instructions and the instructions from which the converted instructions were obtained. Notwithstanding, the emulation software must maintain the architecture rules of the emulated processor architecture so as to assure operating systems and applications written for the emulated processor operate correctly. Furthermore the emulation software must provide resources identified by the emulated processor architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al., and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut; and many others, illustrate the a variety of known ways to achieve emulation of an instruction format architected for a different machine for a target machine available to those skilled in the art.

Figure 16:
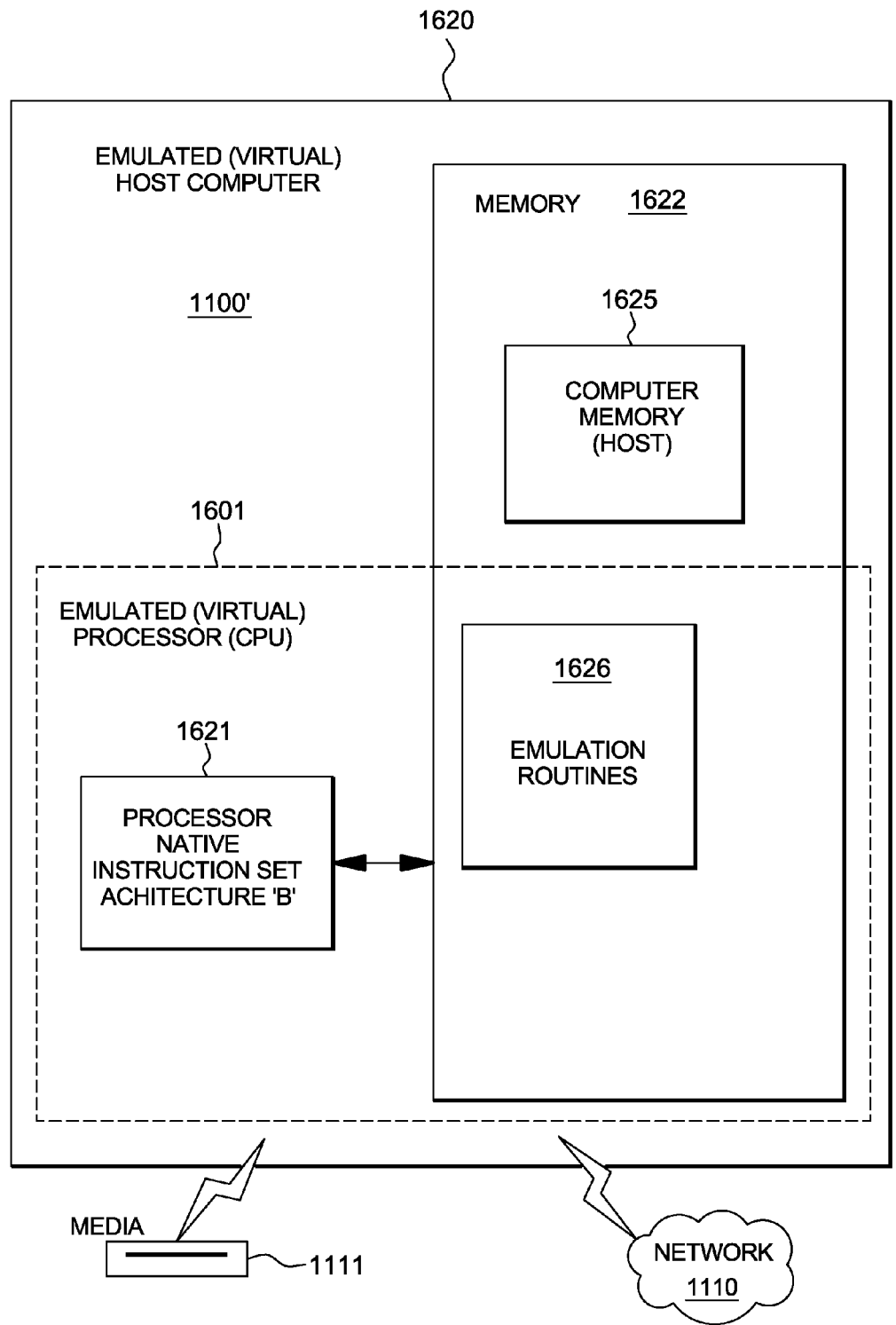
FIG. 16 depicts one embodiment of an emulated host computer system to incorporate and use one or more aspects of the present invention.

In FIG. 16, an example of an emulated host computer system 1620 is provided that emulates an emulated (virtual) host computer 1100' of a Host architecture. In the emulated host computer system 1620, the host processor (CPU) 1601 is an emulated host processor (or virtual host processor) and comprises an emulation processor 1621 having a different native instruction set architecture than that of the processor 1601 of the emulated (virtual) host computer 1100'. The emulated host computer system 1620 has memory 1622 accessible to the emulation processor 1621. In the example embodiment, the memory 1622 is partitioned into a host computer memory 1625 portion and an emulation routines 1626 portion. The host computer memory 1625 is available to programs of the emulated host computer 1620 according to host computer architecture. The emulation processor 1621 executes native instructions of an architected instruction set of an architecture other than that of the emulated processor 1601, the native instructions obtained from emulation routines memory 1626, and may access a host instruction for execution from a program in host computer memory 1625 by employing one or more instruction(s) obtained in a sequence & access/decode routine which may decode the host instruction(s) accessed to determine a native instruction execution routine for emulating the function of the host instruction accessed. Other facilities that are defined for the emulated (virtual) host computer 1100' architecture may be emulated by architected facilities routines, including such facilities as general purpose registers, control registers, dynamic address translation and I/O subsystem support and processor cache for example. The emulation routines may also take advantage of function available in the emulation processor 1621 (such as general registers and dynamic translation of virtual addresses) to improve performance of the emulation routines. Special hardware and off-load engines may also be provided to assist the processor 1621 in emulating the function of the emulated (virtual) host computer 1100'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for facilitating data coherency, the method comprising:
    responsive to attempting access to translated data obtained from original data, checking, by a processor, at least one guard bit associated with the original data to ascertain whether the at least one guard bit indicates coherency with the original data, and, responsive to ascertaining that the at least one guard bit fails to indicate coherency with the original data, initiating discarding of the translated data,
    wherein the at least one guard bit facilitates ascertaining coherency with the original data by indicating whether the original data was modified after the translated data was obtained from the original data, and
    wherein the checking comprises executing a machine instruction comprising referencing a register including a base address, and using the base address to access a guard bit of the at least one guard bit associated with the original data to ascertain whether the original data was modified after the translated data was obtained from the original data.

2. The method of claim 1, wherein the original data is stored in at least one granule of memory of multiple granules of memory of a single memory page, the at least one granule of memory having associated therewith the at least one guard bit for indicating coherency with the at least one granule of memory, wherein the multiple granules of memory of the single memory page further include at least one granule of memory not storing any portion of the original data.

3. The method of claim 1, wherein the translated data comprises a dynamic binary translation of the original data, the dynamic binary translation comprising self-modifying code to modify the original data, and the self-modifying code initiating a data store operation to modify the original data, and wherein the dynamic binary translation is discarded responsive to initiating discarding the translated data.

4. The method of claim 1, wherein the checking the at least one guard bit and the initiating discarding of the translated data are implemented by processing in a load/store unit of the processor, the processing being implemented independent of a data store operation and a data load operation in the load/store unit of the processor, wherein the processing initiates executing of a machine instruction comprising at least one opcode field, a first field specifying a register including a base address, and a second field specifying a signed offset from the base address and specified as a number of cache lines, the executing comprising:
    adding the base address to the signed offset to obtain a result; and
    masking out a set of lower bits of the result to obtain an address aligned to a byte boundary; and
    accessing the guard bit, the accessing comprising retrieving the guard bit of the at least one guard bit associated with the granule of memory comprising the original data, the guard bit facilitating ascertaining coherency with the original data by indicating whether the original data was modified after the translated data was obtained from the original data, wherein the executing the instruction facilitates determining consistency between the translated data and the original data.

5. The method of claim 1, further comprising translating the original data, prior to the attempting access, to obtain the translated data, and setting the at least one guard bit to indicate coherency with the original data, the coherency indicating consistency between the translated data and the original data at the time of translating the original data to obtain the translated data.

6. The method of claim 5, wherein the setting the at least one guard bit is implemented by processing in a load/store unit of the processor, the processing being implemented independent of a data store operation and a data load operation in the load/store unit of the processor, wherein the processing initiates executing of a machine instruction comprising at least one opcode field, a first field specifying a register including a base address, and a second field specifying a signed offset from the base address and specified as a number of cache lines, the executing comprising:

adding the base address to the signed offset to obtain a result;

masking out a set of lower bits of the result to obtain an address aligned to a byte boundary; and accessing the guard bit, the accessing comprising locating and setting the guard bit of the at least one guard bit associated with the granule of memory comprising the original data, wherein the executing the instruction to set the guard bit associated with the granule of memory indicates coherency with the original data and facilitates determining consistency between the original data and translated data obtained from the original data.

7. The method of claim 4, further comprising, prior to the checking:

initiating a data store operation to modify the original data after translating the original data to obtain the translated data; and modifying the at least one guard bit associated with the original data to indicate lack of coherency with the original data as a result of the data store operation, the lack of coherency indicating that the translated data is now inconsistent with the original data as a result of modification of the original data.

8. The method of claim 7, wherein the modifying is initiated by a subroutine implemented in the data store operation and initiated responsive to initiating the data store operation, and wherein the data store operation is implemented by a load/store unit of the processor.

9. The method of claim 7, wherein the modifying is implemented by processing in the load/store unit independent of the data store operation, wherein the processing initiates executing of the machine instruction comprising at least one opcode field, a first field specifying a register including the base address, and a second field specifying a signed offset from the base address and specified as a number of cache lines, the executing comprising:

adding the base address to the signed offset to obtain a result;

masking out a set of lower bits of the result to obtain an address aligned to a byte boundary; and accessing the guard bit, the accessing comprising locating and modifying the guard bit associated with the granule of memory comprising the original data, wherein the modified guard bit associated with the granule of memory indicates lack of coherency with the original data, the lack of coherency indicating that translated data obtained from the original data is now inconsistent with the original data.

10. The method of claim 1, further comprising storing the at least one guard bit with the original data to facilitate access to the at least one guard bit with access to the original data.

* * * * *